United States Patent
Matsuoka et al.

(10) Patent No.: US 6,621,494 B2
(45) Date of Patent: Sep. 16, 2003

(54) MAP DATABASE DEVICE, MAP DISPLAY APPARATUS AND RECORDING MEDIUM CAPABLE OF EFFICIENTLY HAVING AND UTILIZING HEIGHT DATA

(75) Inventors: Youji Matsuoka, Zama (JP); Katsuo Ohuchi, Sagamihara (JP)

(73) Assignee: Xanavi Informatics Corporation, Zama (JP)

( * ) Notice: Subject to any disclaimer, the term of this patent is extended or adjusted under 35 U.S.C. 154(b) by 0 days.

(21) Appl. No.: 09/871,807

(22) Filed: Jun. 4, 2001

(65) Prior Publication Data

US 2001/0028350 A1 Oct. 11, 2001

Related U.S. Application Data

(63) Continuation of application No. 09/227,261, filed on Jan. 8, 1999, which is a continuation of application No. PCT/JP98/02040, filed on May 8, 1998.

(30) Foreign Application Priority Data

| May 9, 1997 | (JP) | 9-119830 |
| Jun. 2, 1997 | (JP) | 9-144374 |

(51) Int. Cl.[7] ............................................. G06T 15/20
(52) U.S. Cl. ........................................ 345/427; 701/209
(58) Field of Search ............................ 345/420, 427, 345/582, 585, 589, 592, 606, 419; 340/990, 995; 701/209

(56) References Cited

U.S. PATENT DOCUMENTS

| 4,805,121 | A | * | 2/1989 | Scott et al. ................. 345/421 |
| 5,179,638 | A | * | 1/1993 | Dawson et al. ............. 395/125 |
| 5,415,549 | A | * | 5/1995 | Logg |
| 5,448,696 | A | * | 9/1995 | Shimada et al. ............ 395/357 |
| 5,742,924 | A | * | 4/1998 | Nakayama ................... 701/208 |
| 5,748,109 | A | * | 5/1998 | Kosaka et al. .............. 340/995 |
| 5,757,290 | A | * | 5/1998 | Watanabe et al. ........... 340/995 |
| 5,793,310 | A | * | 8/1998 | Watanabe et al. ........... 340/995 |
| 5,842,147 | A | * | 11/1998 | Nimura et al. .............. 701/211 |
| 5,884,218 | A | * | 3/1999 | Nimura et al. .............. 701/208 |
| 6,005,581 | A | * | 12/1999 | Gjullin ....................... 345/430 |
| 6,121,972 | A | * | 9/2000 | Takahashi et al. .......... 345/419 |
| 6,141,014 | A | * | 10/2000 | Endo et al. ................. 345/427 |
| 6,169,516 | B1 | * | 1/2001 | Watanabe et al. ........... 345/419 |

FOREIGN PATENT DOCUMENTS

| JP | 4-125679 | 4/1992 |
| JP | 7-146645 | 6/1995 |
| JP | 7-249114 | 9/1995 |
| JP | 9-26749 | 1/1997 |
| JP | 9-147086 | 6/1997 |
| JP | 9-222851 | 8/1997 |
| JP | 9-281890 | 10/1997 |

* cited by examiner

Primary Examiner—Mano Padmanabhan
(74) Attorney, Agent, or Firm—Crowell & Moring LLP

(57) ABSTRACT

The map database device according to the present invention is employed to display a bird's eye view map achieved by converting a two-dimensional map into a display format adopting a bird's eye view method. And the map data base device includes: a height data portion in which height data respectively corresponding to altitudes of a plurality of areas into which the two-dimensional map is divided are respectively stored in correspondence to the areas.

8 Claims, 34 Drawing Sheets

[HEIGHT DATA TABLE]

[ROAD DATA BLOCK: SECONDARY MESH]

[ROAD DATA TABLE]

| NUMBER OF ELEMENT POINTS n |
|---|
| X COORDINATE [ELEMENT POINT 0] |
| Y COORDINATE [ELEMENT POINT 0] |
| X COORDINATE [ELEMENT POINT 1] |
| Y COORDINATE [ELEMENT POINT 1] |
| ⋮ |
| X COORDINATE [ELEMENT POINT n-1] |
| Y COORDINATE [ELEMENT POINT n-1] |
| X COORDINATE [ELEMENT POINT n] |

[THREE-DIMENSIONAL ROAD DATA TABLE]

| NUMBER OF ELEMENT POINTS n | |
|---|---|
| X COORDINATE | [ELEMENT POINT 0] |
| Y COORDINATE | [ELEMENT POINT 0] |
| HEIGHT | [ELEMENT POINT 0] |
| ⋮ | ⋮ |
| X COORDINATE | [ELEMENT POINT n-1] |
| Y COORDINATE | [ELEMENT POINT n-1] |
| HEIGHT | [ELEMENT POINT n-1] |
| X COORDINATE | [ELEMENT POINT n] |
| Y COORDINATE | [ELEMENT POINT n] |
| HEIGHT | [ELEMENT POINT n] |

⟨STATIC DRAWING AREA⟩

⟨DYNAMIC DRAWING AREA⟩

TWO-DIMENSIONAL MAP

BIRD'S EYE VIEW MAP

THREE-DIMENSIONAL BIRD'S EYE VIEW MAP

STREET/BUILDING MAP

STRUCTURE OF COLOR DATA TABLE

MAP DATABASE DEVICE, MAP DISPLAY APPARATUS AND RECORDING MEDIUM CAPABLE OF EFFICIENTLY HAVING AND UTILIZING HEIGHT DATA

This application is a continuation of application Ser. No. 09/227,261, filed Jan. 8, 1999, which is a continuation of PCT/JP98/02040 having an international filing date of May 8, 1998.

TECHNICAL FIELD

The present invention relates to a map display apparatus that three-dimensionally displays a two-dimensional map (plane map) as a bird's eye view map achieved by converting the two dimensional map into a bird's eye view display format, whereby ground levels and roads are displayed either depressed or elevated in correspondence to their altitudes, and a map database device and a recording medium to be employed in such a map display apparatus.

BACKGROUND ART

Map display apparatuses for vehicles that display a roadmap through the so-called bird's eye view method, whereby the area on the roadmap in the vicinity of the current position of the vehicle is displayed larger than the area on the roadmap in the distance on a display apparatus, are known in the prior art (for instance, see Japanese Laid-Open Patent Publication No. Heisei 2-244188). In the apparatus disclosed in the publication mentioned above, the viewpoint is set behind the current position of the vehicle and the view obtained by looking down from this viewpoint in the advancing direction of the vehicle is displayed on the screen of the display apparatus. Since the map information in regard to the vicinity of the current position can be displayed in an enlargement and a wide range of view from the current position to a distant position can be displayed by implementing map display through such bird's eye view method (hereafter a map displayed through the bird's eye view method is referred to as a bird's eye view map to be differentiated from a two-dimensional map which is displayed in two dimensions), the state of the connection between roadmap areas can be visually ascertained with a greater degree of ease. In addition, roadmap display that gives the driver the feeling that he is actually looking down on the area of the roadmap is achieved.

While three-dimensional display of roads and the like displayed in such a bird's eye view map is achieved by adding height data to positional coordinate data of the individual element points on roads, the volume of data will become too large, and as a result, three-dimensional display is implemented only for specific structures such as bridges and interchanges in a map display apparatus for vehicles. However, it is difficult to achieve three-dimensional display of all the roads, bridges and interchanges through this method due to the high memory capacity requirements, which will result in an increase in production costs and it is even more difficult to display the ground levels with depressions and elevations in correspondence to their altitudes.

DISCLOSURE OF THE INVENTION

An object of the present invention is to provide a map database device with which the volume of the data indicating altitudes can be reduced when three-dimensionally displaying the ground levels and roads in a bird's eye view map in correspondence to their altitudes, a recording medium in which the relevant map data are recorded, and a map display apparatus that utilizes the data with a high degree of efficiency.

In order to achieve the object described above, the map database device according to the present invention is employed to display a bird's eye view map achieved by converting a two-dimensional map into a display format of a bird's eye view method. And the map data base device comprises: a height data portion in which height data respectively corresponding to altitudes of a plurality of areas into which the two-dimensional map is divided are respectively stored in correspondence to the areas.

This makes it possible to reduce the volume of the data indicating altitudes required for three-dimensionally displaying ground levels and roads in a bird's eye view map based upon their altitudes.

An alternative map database device is employed to display a bird's eye view map achieved by converting a two-dimensional map into a display format adopting the bird's eye view method. The map database device comprises: a height data portion in which height data respectively corresponding to altitudes of a plurality of areas into which the two-dimensional map is divided are respectively stored in correspondence to the areas; and a road data portion in which a road extending within the two-dimensional map is expressed with a plurality of element points and positional coordinates of each of the element points in the two-dimensional map are stored.

This, in addition to achieving an advantage similar to that described above, makes it possible to incorporate altitude data with the road data.

A map display apparatus according to the present invention displays a bird's eye view map achieved by converting a two-dimensional map into a display format adopting the bird's eye view method. And the map display apparatus comprises: a database device that includes at least a height data portion in which height data respectively corresponding to altitudes of a plurality of areas into which the two-dimensional map is divided are respectively stored in correspondence to the areas, and a road data portion in which a road extending within the two-dimensional map is expressed with a plurality of element points and positional coordinates of each of the element points in the two-dimensional map are stored; and a calculation means for performing calculation to determine in which of the areas the element point read out from the road data portion is located, reading out height data corresponding to the area ascertained through the calculation from the height data portion to use as height data for the element point, and calculating coordinate values of the element point on the bird's eye view map to be displayed on a monitor screen based upon positional coordinates read out from the road data portion and the height data obtained through calculation.

This makes it possible to three-dimensionally display roads in the bird's eye view map based upon their altitude data while reducing the volume of the data indicating the altitudes.

An alternative map display apparatus displays a bird's eye view map by converting a two-dimensional map into a display format adopting the bird's eye view method. And the map display apparatus comprises: a height data portion in which height data respectively corresponding to altitudes of a plurality of areas into which the two-dimensional map is divided are respectively stored in correspondence to the areas; a calculation means for calculating coordinate values on the bird's eye view map to be displayed on a monitor screen for a point in each of the areas based upon positional coordinates and height data of the point; and a gradation means for achieving gradation display of areas enclosed by the points on the monitor screen in correspondence to heights of the individual points.

This achieves simplification in the calculation for the gradation display when displaying the ground levels in a bird's eye view map in gradations based upon their altitude data while keeping down the volume of data required.

An alternative map display apparatus displays a bird's eye view map achieved by converting a two-dimensional map into a display format adopting the bird's eye view method. And the map display apparatus comprises: a map database device that includes a height data portion in which height data respectively corresponding to altitudes of a plurality of areas into which the two-dimensional map is divided are respectively stored in correspondence to the areas, and a tunnel data portion in which a tunnel within the two-dimensional map is expressed with a plurality of element points and positional coordinates of each of the element points in the two-dimensional map are stored; and a calculation means for performing calculation to determine which of the areas element points corresponding to an entrance and an exit among the element points read out from the tunnel data portion are located in, reading out height data corresponding to the areas determined through the calculation from the height data portion to use as height data of the entrance and the exit, interpolating other element points with the height data of the entrance and the exit to create height data therefor, and calculating coordinate values of the element points on the bird's eye view map to be displayed on a monitor screen based upon positional coordinates read out from the tunnel data portion and height data obtained through calculation.

With this, since the height in the middle section of the tunnel is calculated through interpolation using the heights at the entrance and the exit in order to display the section between the tunnel entrance and the tunnel exit as a dotted line or the like to make it appear as if it was present underground, the tunnel can be displayed in a natural manner without the middle section of the tunnel present on the ground level while reducing the volume of data representing altitudes.

An alternative map display apparatus displays a bird's eye view map by converting a two-dimensional map into a display format adopting the bird's eye view method. And the map display apparatus comprises: a height data portion in which height data respectively corresponding to altitudes of a plurality of areas into which the two-dimensional map is divided are respectively stored in correspondence to the areas; a calculation means for calculating coordinate values on the bird's eye view map to be displayed on a monitor screen for a point in each of the areas based upon positional coordinates and height data of the point; and a gradation means for calculating a difference between a minimum height and a maximum height among a plurality of areas enclosed by the points within the monitor screen, respectively assigning m sets of color data among color data determined in advance with fixed gradation pitch to m color palettes in a predetermined order when the difference is equal to or less than a specific value, calculating a variable gradation pitch by dividing the difference by m if the difference exceeds the specific value to assign m sets among the color data provided in the predetermined order to the m color palettes with the variable gradation pitch, in order to achieve gradation display of each of areas enclosed by the points on the monitor screen in correspondence to heights of the individual points.

With this, it becomes possible to implement gradation display in color by efficiently utilizing a limited number of color palettes while minimizing the volume of data representing altitudes.

A recording medium according to the present invention which can be read by a computer, records: map data that has a height data portion in which height data respectively corresponding to altitudes of a plurality of areas into which a two-dimensional map is divided are respectively stored in correspondence to the areas for displaying a bird's eye view map by converting the two-dimensional map into a display format of bird's eye view method.

This makes it possible to provide map data with a reduced volume of data representing altitude stored in the recording medium when three-dimensionally displaying ground levels and roads in a bird's eye view map based upon their altitudes.

An alternative map display apparatus displays a bird's eye view map by converting a two-dimensional map into a display format adopting the bird's eye view method. The map display apparatus comprises: map data that include two-dimensional map data and height data; and a three-dimensional bird's eye view map display means for three-dimensionally displaying the bird's eye view map on a display screen based upon the map data taking the height data into consideration. And: the map data comprise detailed map data at a large scaling factor and wide range map data at a scaling factor smaller than the detailed data; the display screen is divided into, at least, a first display area and a second display area adjacent to the first display area, the first display area being set at a side closer to a viewpoint in a bird's eye view method, and the second display area being set on a side further away from the viewpoint; and the three-dimensional bird's eye view map display means displays a three-dimensional bird's eye view map in the first display area based upon the detailed map data, displays a three-dimensional bird's eye view map in the second display area based upon the wide range map data, sets a hypothetical line of sight that extends from the viewpoint to pass through a point corresponding to a boundary of the first area and the second area on the display screen, and determines ranges, over which the detailed map data and the wide range map data are to be used, in reference to a point at which the line of sight intersects a line corresponding to a ground level calculated by taking the height data into consideration.

With this, since the position at which the display screen is split is changed in consideration of the height of the ground level, the image does not become disconnected in the vicinity of boundaries of the detailed information area and the wide range information area when expressing depressions and elevations in the ground level.

BEST MODE FOR CARRYING OUT THE INVENTION

Figure 1:
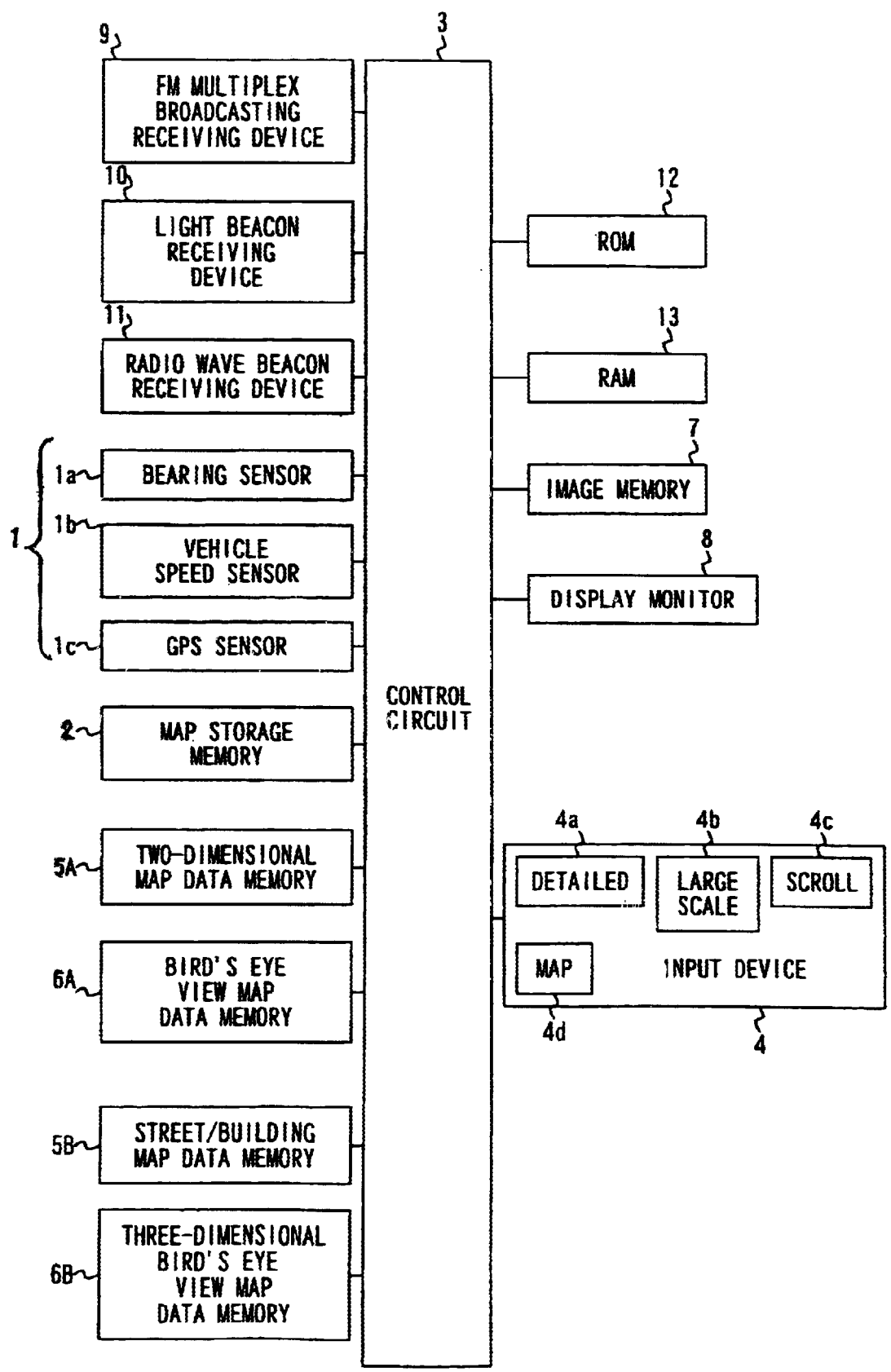
FIG. 1 is a block diagram illustrating one embodiment of the map display apparatus according to the present invention.

FIG. 1 is a block diagram of an embodiment of the map display apparatus according to the present invention. In FIG. 1, reference number 1 indicates a current position detection device that detects the current position of the vehicle, comprising, for instance, a bearing sensor 1a for detecting the advancing direction of the vehicle, a vehicle speed sensor 1b for detecting the vehicle speed, a GPS sensor 1c for detecting a GPS signal from a GPS (global positioning system) satellite and the like. Reference number 2 indicates a map storage memory that stores data related to a two-dimensional (or plane) roadmap and a street/building map which may be constituted of, for instance, a CD ROM and a read out device. The roadmap data stored in the map storage memory 2 are mainly constituted of road data on a two-dimensional map, name data, background data, and the like. As is to be explained later, in the map storage memory 2, an area for storing in memory altitude data corresponding to individual small areas achieved by dividing the map into a mesh, is provided.

Reference number 3 indicates a control circuit that controls the entire apparatus, comprising a microprocessor and peripheral circuits. Reference number 4 indicates an input device provided with various switches for inputting a destination for the vehicle and the like, and in this example, it is provided in the periphery of the display screen. Detailed/wide range switches 4a and 4b are switches employed to implement detailed display and wide range display of a display map. In this example, switching can be implemented over five levels from the most detailed to the largest range, and in a bird's eye view map display, the height of the viewpoint is set at 350 m, 700 m, 1400 m, 2800 m and 5600 m in correspondence to the individual levels. A scroll switch 4c is employed to scroll the display screen up/down and left/right, and the selection may be made from switches in various forms or a so-called joystick may be employed. Alternatively, a scroll switch that changes the line of sight (looking down) direction relative to the current position set as a center may be provided. In that case, the screen can be scrolled upward or downward vertically or in rotating direction. In the input device 4 another map switch 4d and various switches that are not shown are provided. It is to be noted that the input device 4 may employ a remote control method to transmit commands either wireless or wired to the control circuit, or touch-panel switches may be provided within the screen.

Reference number 5A indicates a two-dimensional map data memory that stores two-dimensional roadmap drawing data employed for displaying a two-dimensional roadmap seen from directly above and the data are prepared based upon two-dimensional roadmap data read out from the map storage memory 2. Reference number 5B indicates a street/building map data memory that stores street/building map drawing data for displaying a street/building map seen from directly above and the data are prepared based upon street/building map data read out from the map storage memory 2.

Reference number 6A is a bird's eye view map data memory that stores bird's eye view map drawing data employed for displaying a two-dimensional roadmap through bird's eye view method, and the data are prepared based upon two-dimensional roadmap data read out from the map storage memory 2. Since the method for converting a two-dimensional map to a bird's eye view map is known in the prior art, the explanation thereof is omitted. Reference number 6B indicates a three-dimensional bird's eye view map data memory that stores three-dimensional bird's eye view map drawing data that express depressions and elevations in the ground level by incorporating height data with the bird's eye view map prepared from the two-dimensional map and the data are prepared based upon the two-dimensional roadmap data read out from the map storage memory 2 and height data corresponding to individual mesh areas that are to be detailed later.

Reference number 7 indicates an image memory that stores image data for display on a display monitor 8 that is to be detailed later and the image data are prepared by combining any one of the following types of data, i.e., the two-dimensional map drawing data, the street/building map drawing data, the bird's eye view map drawing data and the three-dimensional bird's eye view map drawing data, and graphic data representing VICS information and the like. The image data stored in the image memory 7 are read out as necessary to be displayed on the display monitor 8.

Reference number 9 indicates an FM multiplex broadcasting receiving device, reference number 10 indicates a light beacon receiving device and reference number 11 indicates an radio wave beacon receiving device for receiving traffic information (hereafter referred to as VICS information) transmitted through FM multiplex broadcasting radio wave, light beacon and radio wave beacon respectively.

The VICS information refers to traffic jam information, traffic regulation information, parking lot information, service area information and parking area information. In addition, the traffic regulation information includes car lane regulation information and ramp regulation information and interchange regulation information on expressways. As the traffic jam information, a traffic jam is indicated in red, heavy traffic is indicated in yellow and light traffic is indicated in green for both upstream and downstream traffic directions.

Figure 2:
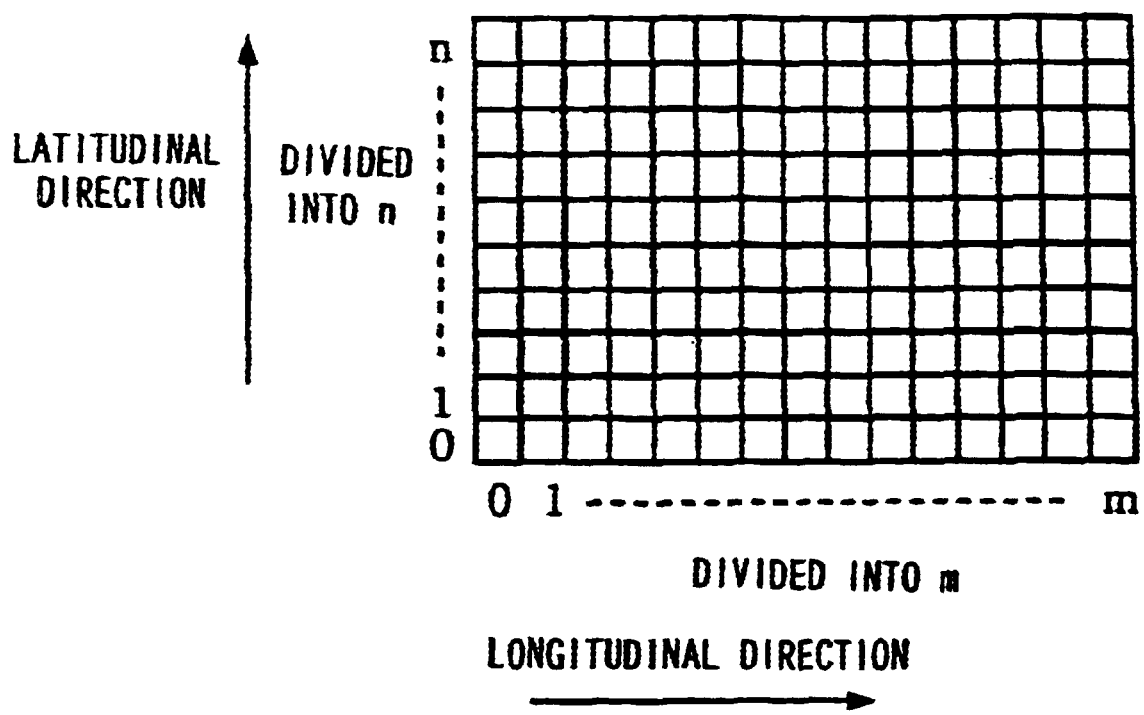
FIG. 2 illustrates height data in a secondary mesh-size area.
Figure 3:
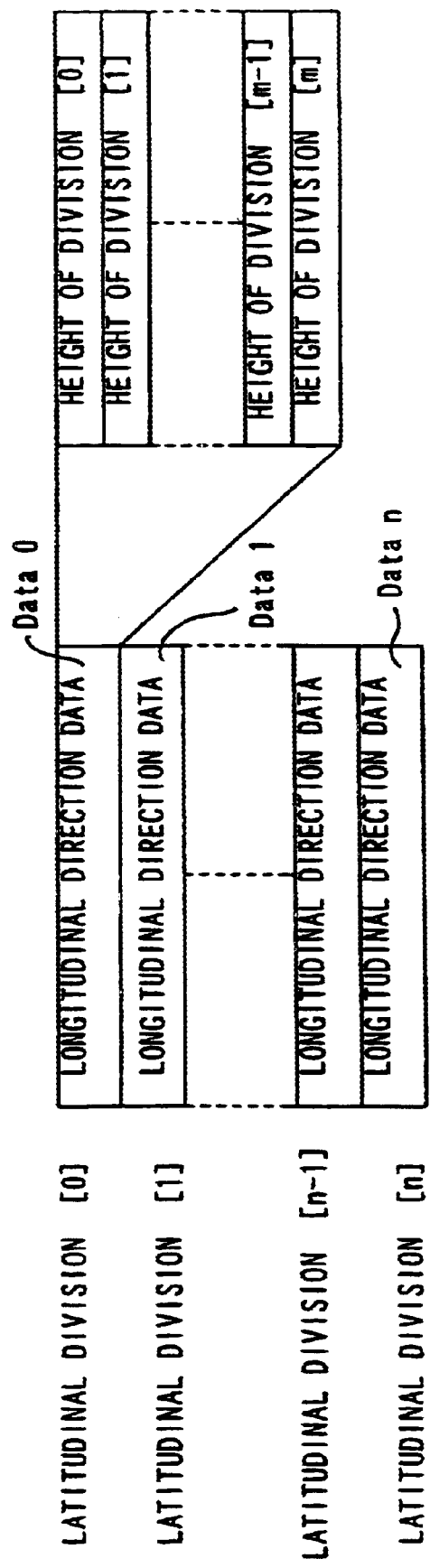
FIG. 3 illustrates an example of the height data table.

FIGS. 2 and 3 illustrate height data. FIG. 2 illustrates n×m (e.g., 64) small areas achieved by dividing an area whose range is referred to as a secondary mesh (e.g., a range of 10 km in the latitudinal direction by 12 km in the longitudinal direction) into n rows in the latitudinal direction and m columns in the longitudinal direction, and height data are assigned to the individual small areas. The height data of each small area may be determined based upon contour lines passing through the small area. For instance, if a 200 m contour line and a 300 m contour line pass through the small area symmetrically relative to the central line used as the axis, the height data will indicate 250 m. This means that height data for the small areas are different from altitude data.

FIG. 3 illustrates a specific example of the height data table that stores the height data. In a longitudinal direction data field Data 0 in row 0 in the latitudinal direction, the height data corresponding to individual small areas that are specified by longitudinal division numbers 0 through m (column 0 through column m) are stored. Likewise, in each of longitudinal direction data fields Data 1 through Data n in rows 1 through n in the latitudinal direction, the height data of individual small areas specified by longitudinal division numbers 0 through m (column 0 through column m) are individually stored. It is to be noted that under normal circumstances, mesh numbers are assigned to the "n (rows)×m (columns) small areas" to facilitate management.

Figures 4, 5:
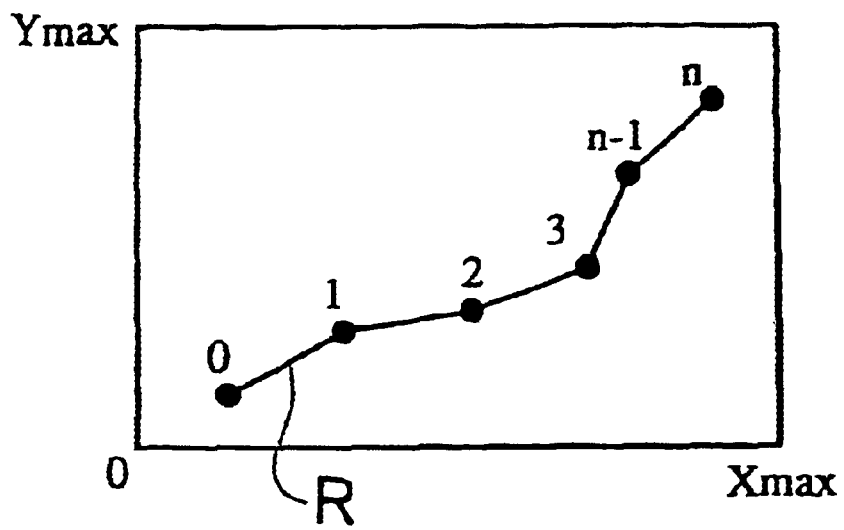
FIG. 4 illustrates road data within a secondary mesh.
FIG. 5 illustrates the road data table.

FIG. 4 illustrates a road present within a secondary mesh area similar to that illustrated in FIG. 2. In this figure, the maximum coordinate in the longitudinal direction is assigned Xmax and the maximum coordinate in the latitudinal direction is assigned as Ymax. In FIG. 4, one road R is defined by element points (also referred to as nodes) 0, 1, 2 . . . n−1, n. The element point 0 is referred to as a start point, the element point n is referred to as an end point and the element points 1, 2 . . . n−1 between the start point 0 and the end point n are referred to as interpolation points. In addition, the road R may also be referred to as a link string. Lines connecting the individual element points are referred to as links and the individual links are identified by their link numbers. The positions of the start point 0, the end point n and the interpolation points 1 through n−1 on a map are determined with the corresponding X and Y coordinate data. FIG. 5 illustrates a specific example of the road data table that stores data related to the road R, and the X coordinate and the Y coordinate of each of the element points 0 through n constituting one link string are stored. It is to be noted that the size of the link string, the number of element points constituting the link string, the attributes of the link (classification data indicating national highway, prefectural highway, expressway, tunnel, bridge and the like), route line number and the like are also stored in the road data table.

Figures 6, 7:
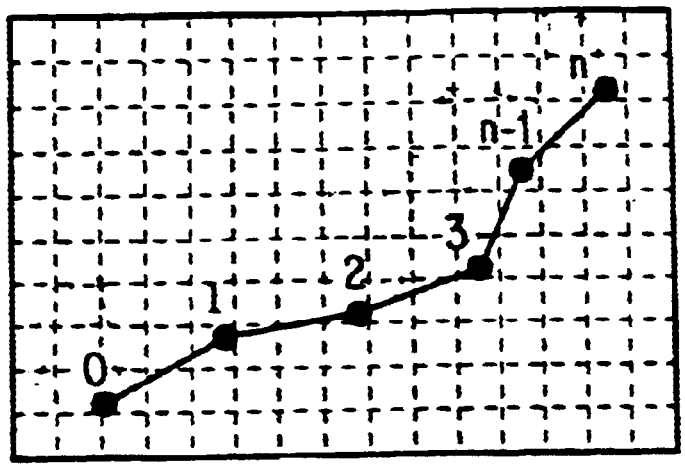
FIG. 6 illustrates a road superimposed upon secondary mesh height data.
FIG. 7 illustrates the three-dimensional road data table.

FIG. 6 illustrates the road R in FIG. 4 superimposed upon the secondary mesh area in FIG. 2, with the element points 0 through n each contained in one of the small areas in the secondary mesh. The following Expression (1) and Expression (2) may be used to calculate in which small areas the element points 0 through n are contained.

(longitudinal direction division number)=$(Xi/Xmax) \times$(number of latitudinal divisions $m$) (1)

(latitudinal direction division number)=$(Yi/Ymax) \times$(number of latitudinal divisions $n$) (2)

In these expressions, Xi and Yi represent the X coordinate and the Y coordinate of each of the element points 0 through n.

A three-dimensional road data table, as illustrated in FIG. 7 is prepared by reading out the height data corresponding to a small area specified by the longitudinal direction division number and the latitudinal direction division number thus calculated, from the height data table illustrated in FIG. 3. In the data table in FIG. 7, the X and Y coordinates and the height data for the element points 0 through n are stored.

By converting the two-dimensional positional coordinates of the element points 0 through n to two-dimensional positional coordinates on a bird's eye view map. Furthermore, by incorporating the height data of the individual element points to convert the element points to the screen coordinates set on the monitor, the road R can be displayed three-dimensionally, as indicated with the solid line Rsol in FIG. 8. It is to be noted that the dotted line Rdot indicates the road that would appear on the bird's eye view map if the height data were not incorporated, and that in this specification, a bird's eye view map display without incorporating height information is simply referred to as bird's eye view map display, whereas a bird's eye view map display incorporating height information is referred to as three-dimensional bird's eye view map display.

Next, the procedure for preparing a three-dimensional bird's eye view map by displaying the heights of small areas in gradation on the screen coordinates based upon the height data corresponding to the secondary mesh small areas shown in FIG. 2 is explained.

Figure 9:
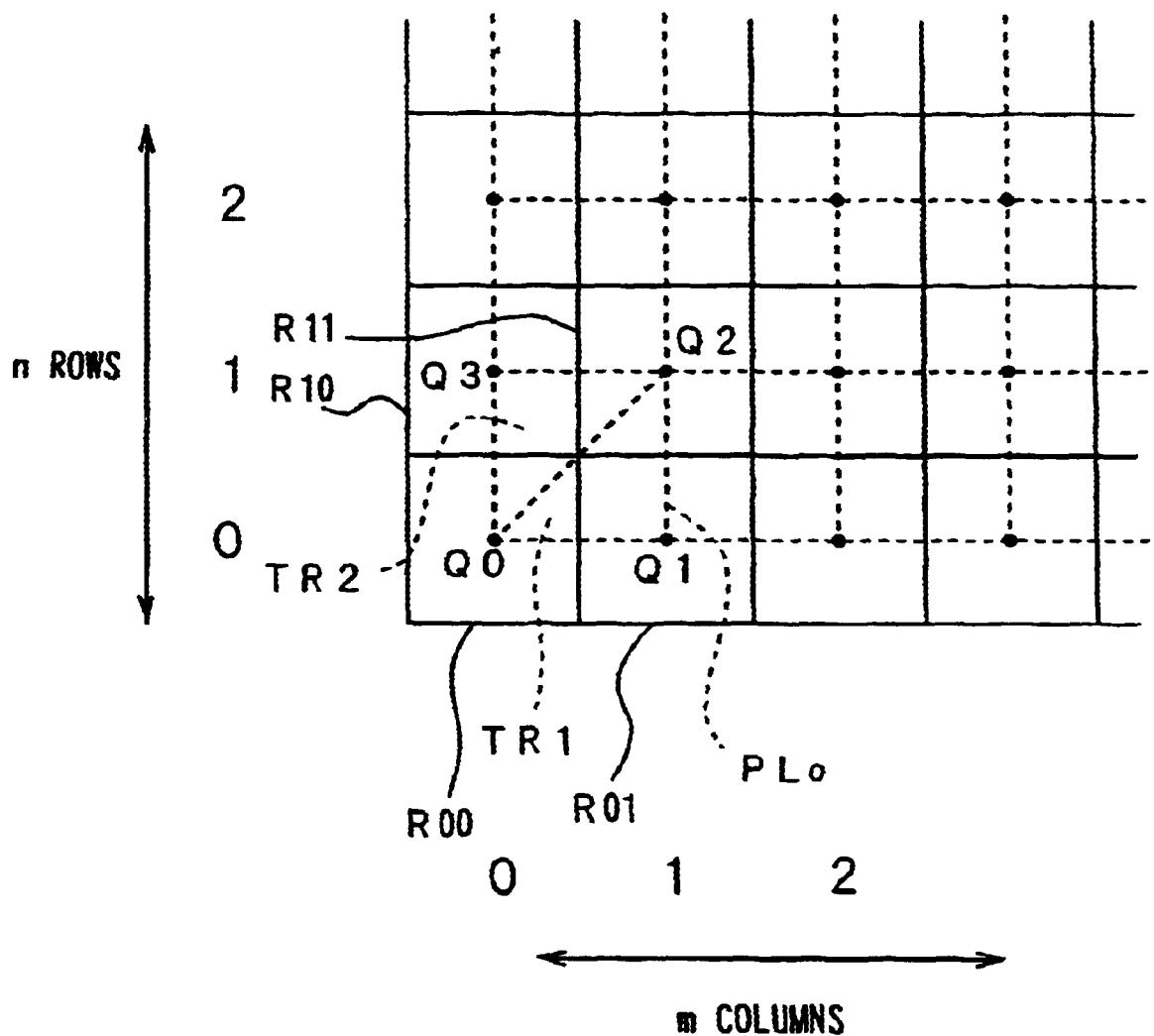
FIG. 9 is an enlargement of secondary mesh height data.

FIG. 9 is an enlargement of the left corner of FIG. 2. The small area in row 0, column 0 is assigned as R00, the small area in row 0, column 1 is assigned as R01, the small area in row 1, column 0 is assigned as R10 and the small area in row 1, column 1 is assigned as R11, with the central points of the individual small areas R00 through R11 respectively assigned as Q0 through Q3. The positional coordinates of the central points Q0 through Q3 are already known, and the heights of the individual small areas R00 through R11 are already known from the height data table. As a result, by hypothesizing that the heights of the central points Q0 through Q3 of the individual small areas R00 through R11 are the heights of the small areas R00 through R11, the three-dimensional positional coordinates of plane PL0 enclosed by these four points can be calculated. If the heights of the four central points Q0 through Q3 are all equal, the plane PL0 is converted to a plane on a bird's eye view map and then the converted plane is further converted to a plane on the monitor screen. Since the plane PL0 has a consistent height, pixels within the plane on the monitor screen corresponding to the plane PL0 are all displayed in the same color.

Next, the color expression method that is adopted when the heights of the individual points Q0 through Q3 of the plane PL0 are all different, is explained. When the heights of the individual points Q0 through Q3 of the plane PL0 are all different, the quadrangle PL0 is divided into a triangle TR1 enclosed by the central points Q0, Q1 and Q2 and a triangle TR2 enclosed by the central points Q0, Q2 and Q3, as illustrated in FIG. 9, for instance, and colors of the individual pixels within each triangular area are calculated for gradation display. A more detailed explanation is given in reference to FIGS. 10A and B.

Figure 10A:
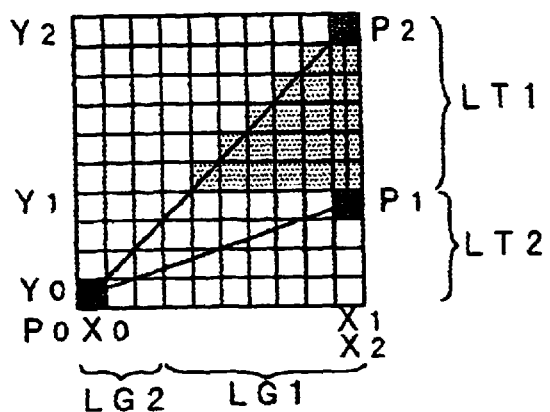
FIGS. 10A through 10C illustrate the gradation display.

FIG. 10A shows the monitor screen as an aggregation of pixels (dots) and presents the screen coordinate system. Each grid represents one pixel (dot). A dot P0, a dot P1 and a dot P2 are pixels respectively corresponding to the points Q0, Q1 and Q2 located within the small area R00, the small area R01 and the small area R11 in FIG. 9. Since FIG. 10 presents the planar view in FIG. 9 as a bird's eye view displayed on the monitor screen, the right triangle TR1 enclosed by the points Q0, Q1 and Q2 in FIG. 9 becomes deformed and is enclosed in FIG. 10 by the dots P0, P1 and P2 as a result of the coordinate conversion to the bird's eye view. The individual dots P0, P1 and P2 each have an X coordinate and a Y coordinate and a color palette number in the screen coordinate system, and each set of data can be expressed as (X0, Y0, C0), (X1, Y1, C1), (X2, Y2, C2) or the like. In the data, the X coordinate and the Y coordinate represent the horizontal direction pixel number and the vertical direction pixel number on the monitor and C represents the color palette number, which specifies a color that is assigned to the height data in advance. A further explanation will be given in regard to the color palette number.

Figure 10B:
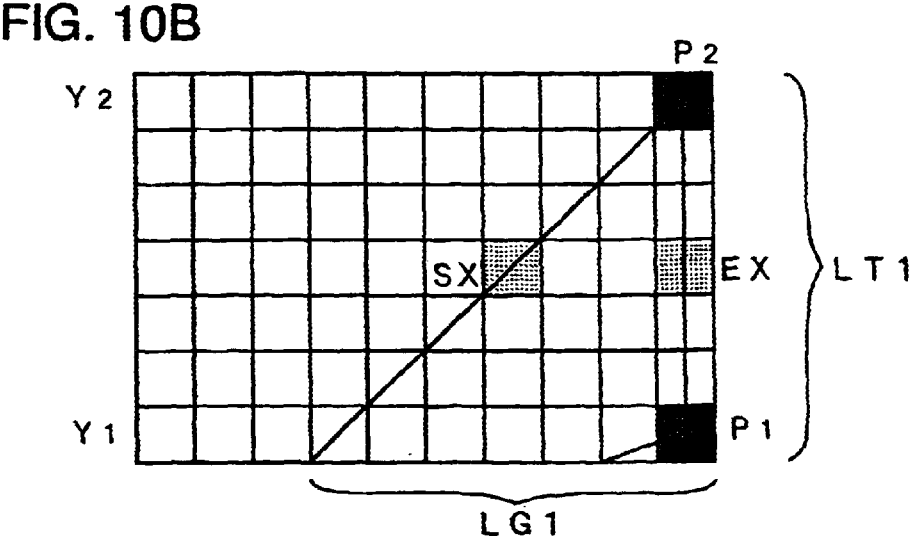

The gradation of the colors of the individual pixels in the area enclosed by the dots P0, P1 and P2 is calculated in the following manner. FIG. 10B illustrates the calculation for gradation display of an upper half of the area enclosed by the dots P0, P1 and P2, i.e., the area extending from the dot P2 to the dot P1 corresponding to the latitudinal coordinates Y2 through Y1 (the area defined by the longitudinal direction LG1 and the latitudinal direction LT1).

In FIG. 10B, if a drawing start point pixel is Sx, a drawing end point pixel is Ex, a start point color palette number is Scolor, an end point color palette number is Ecolor, an increase in color starting from the drawing start point and heading toward the drawing end point is CP, and the Y coordinate of the drawing pixel line extending in the longitudinal direction at a given latitude is yp, they are expressed through the following Expressions (3) through (7):

$$Sx = X0 + ((X2-X0)/(Y2-Y0)) \times (yp-Y0) \quad (3)$$

$$Ex = X1 + ((X2-X1)/(Y2-Y1)) \times (yp-Y1)) \quad (4)$$

$$Scolor = C0 + ((C2-C0)/(Y2-Y0)) \times (yp-Y0)) \quad (5)$$

$$Ecolor = C1 + ((C2-C1)/(Y2-Y1)) \times (yp-Y1)) \quad (6)$$

$$CP = (Ecolor - Scolor)/(Er - Sx) \quad (7)$$

Figure 10C:
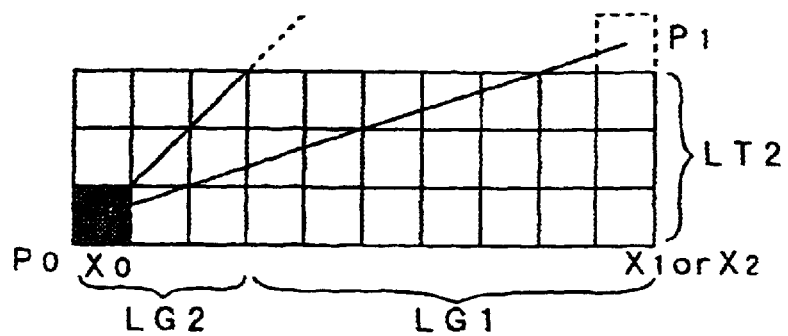

FIG. 10C illustrates the calculation for gradation display of a lower half of the area enclosed by the dots P0, P1 and P2, i.e., the area ranging from the dot P0 to the dot P1 corresponding to the latitudinal coordinates Y0 through Y1 (the area defined by the longitudinal direction LG1+LG2 and the latitudinal direction LT2). The gradation display is calculated through the following Expressions (8) through (12):

$$Sx = X0 + ((X2-X0)/(Y2-Y0)) \times (yp-Y0) \quad (8)$$

$$Ex = X0 + ((X1-X0)/(Y1-Y0)) \times (yp-Y0) \quad (9)$$

$$Scolor = C0 + ((C2-C0)/(Y2-Y0)) \times (yp-Y0) \quad (10)$$

$$Ecolor = C0 + ((C1-C0)/(Y1-Y0)) \times (yp-Y0) \quad (11)$$

$$CP = (Ecolor - Scolor)/(Er - Sx) \quad (12)$$

Figure 30:
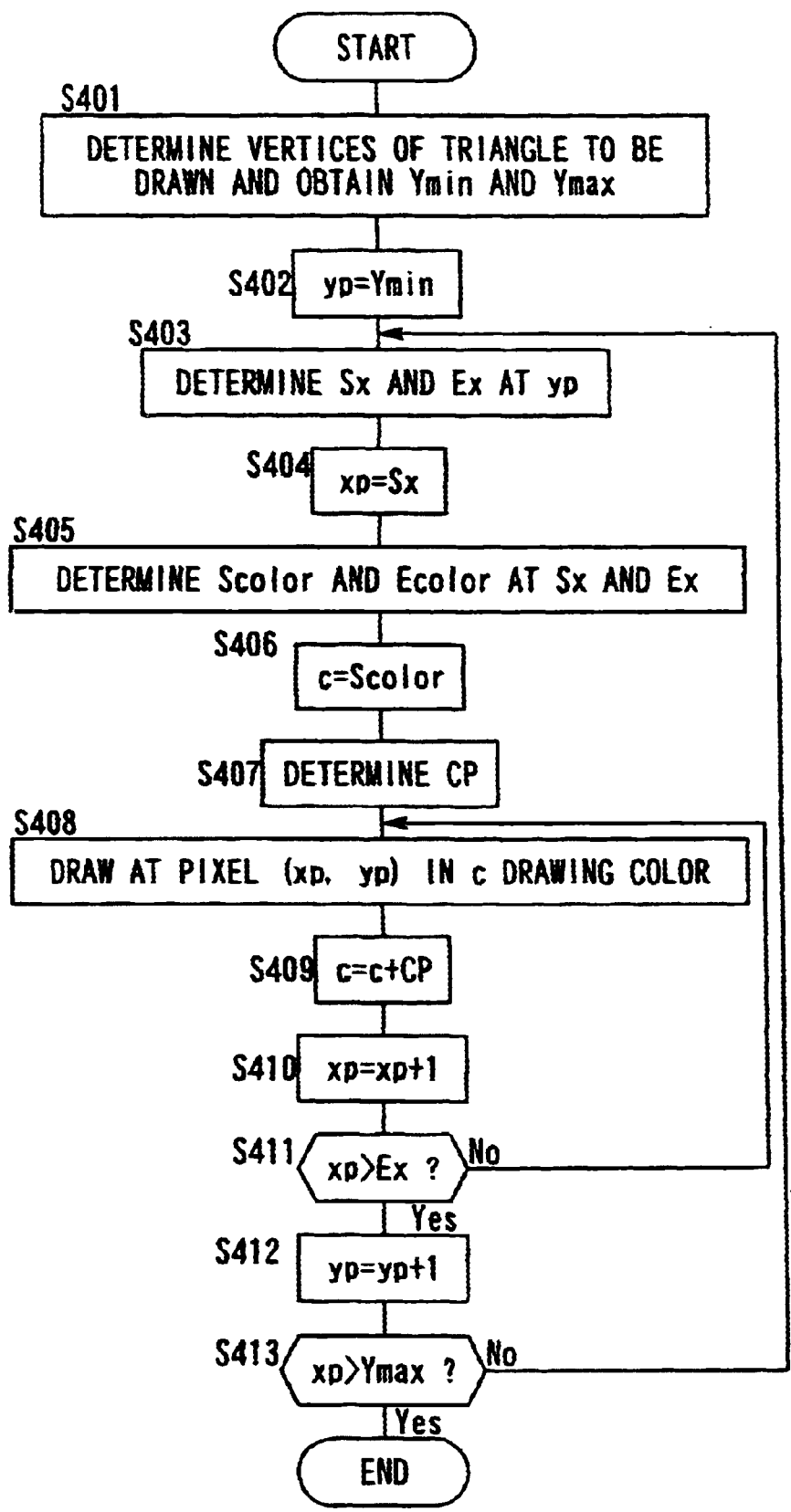
FIG. 30 is a flowchart illustrating the control implemented when drawing a map in gradation display (gradation processing)

The flow of the control implemented for drawing (gradation processing) the triangular area enclosed by the dots P0, P1 and P2 in FIG. 10A in gradation display by using the Expressions (3) through (12) presented above is explained in reference to FIG. 30. In FIG. 30, first, in step S401, the vertices of the triangle to be drawn are determined and a drawing start point pixel Ymin and a drawing end point pixel Ymax in the direction of the Y axis are determined. In FIG. 10A, since the coordinates (pixel numbers) of the vertices of the triangle in the screen coordinate system (the monitor screen) are provided as (X0, Y0), (X1, Y1) and (X2, Y2) for the dots P0, P1 and P2 respectively, Ymin=Y0 and Ymax=Y2. In step S402, Ymin is used to substitute the variable yp in the direction of the Y axis. In step S403, the drawing start point pixel Sx and a drawing end point pixel Ex at a Y coordinate yp are determined. In reference to FIG. 10A, if yp is within the range of Y0 through Y1, Expressions (8) and (9) are used, whereas if yp is within the range of Y1 through Y2, Expressions (3) and (4) are used. In step S403, the drawing start point pixel Sx thus determined is used to substitute the variable xp in the direction of the X axis. In step S405, the color palette numbers Scolor and Ecolor at the drawing start point pixel Sx and at the drawing end point pixel Ex are determined. For this purpose, Expressions (10) and (11) are used if yp is within the range of Y0 through Y1, whereas Expressions (5) and (6) are used if yp is within the range of Y1 through Y2. In step S406, Scolor is used to substitute the color palette number variable c. In step S407, the color increase, i.e., the increase CP in the color palette number, is ascertained by using Expression (7) or Expression (12).

In step S408, drawing is performed at the pixel (xp, yp) using the drawing color corresponding to the color palette number c. In step S409, by increasing the color palette number by the increase CP, the next color palette number is set to change the gradation, and by adding one to xp in step S410, the adjacent pixel in the direction of the X axis is set. In step S411, a decision is made as to whether or not xp is beyond the drawing end point pixel Ex, and the operation proceeds to step S412 if xp is decided to be beyond the drawing end point pixel Ex. If, on the other hand, it is decided that xp is not beyond Ex yet, the operation returns to step S408 to repeat the processing to complete the drawing in direction X at the line of the Y coordinate yp. In step S412, one is added to yp to shift the pixel line by one in the direction of the Y axis. In step S413, a decision is made as to whether or not yp is beyond the drawing end point pixel Ymax in the direction of the Y axis, and if it is decided that it is beyond Ymax, the drawing has been completed and the processing ends. If, on the other hand, it is decided that yp is not beyond Ymax yet, the operation returns to step S403 to repeat the processing.

The gradation calculation is implemented and drawing is performed for the two triangular areas other than the area enclosed by the dots P0, P1 and P2 in FIG. 10A in a similar manner. The gradation calculation and the drawing is implemented for the area below the line connecting the dots P0 and P1 in FIG. 10A by using the triangle enclosed by the dots P0 and P1 and the central point within the small area adjacent to P1 in the latitudinal direction, and for the area above the line connecting the dots P0 and P2 in FIG. 10A by using the triangle enclosed by the dots P0 and P2 and the central point within the small area adjacent to P0 in the latitudinal direction. It is to be noted that arbitrary points within the small areas instead of the central points may be used to perform the gradation calculation and the drawing processing.

Figure 8:
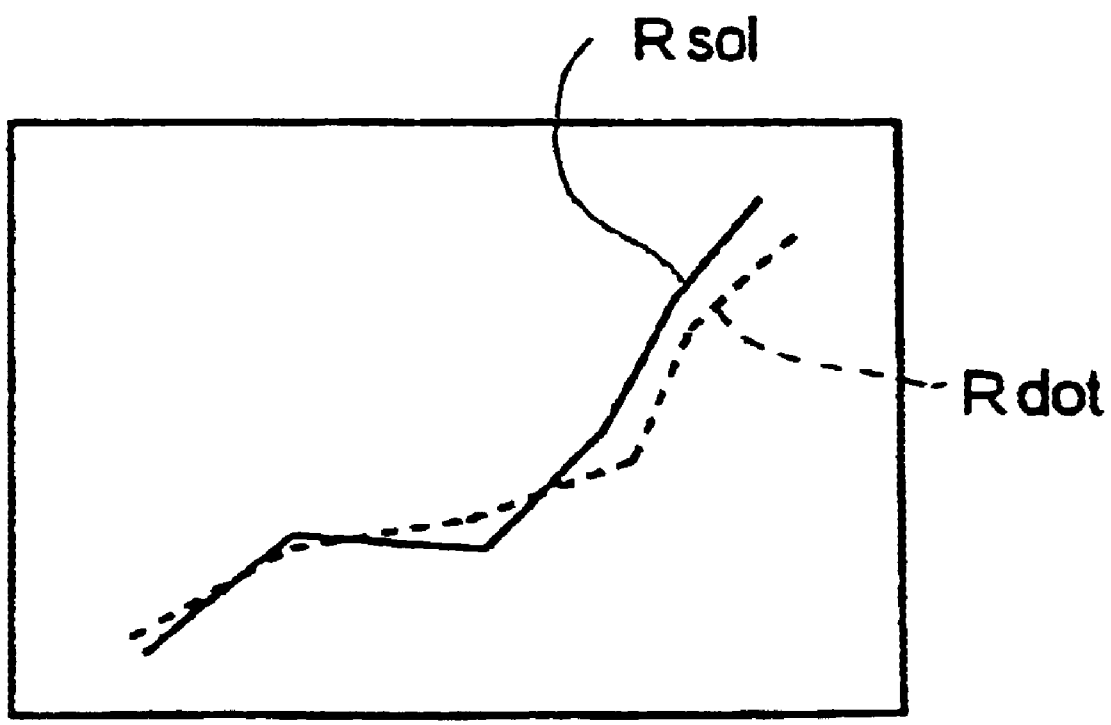
FIG. 8 illustrates the difference between a road expressed using two-dimensional road data and the same road expressed using three-dimensional road data.
Figure 11:
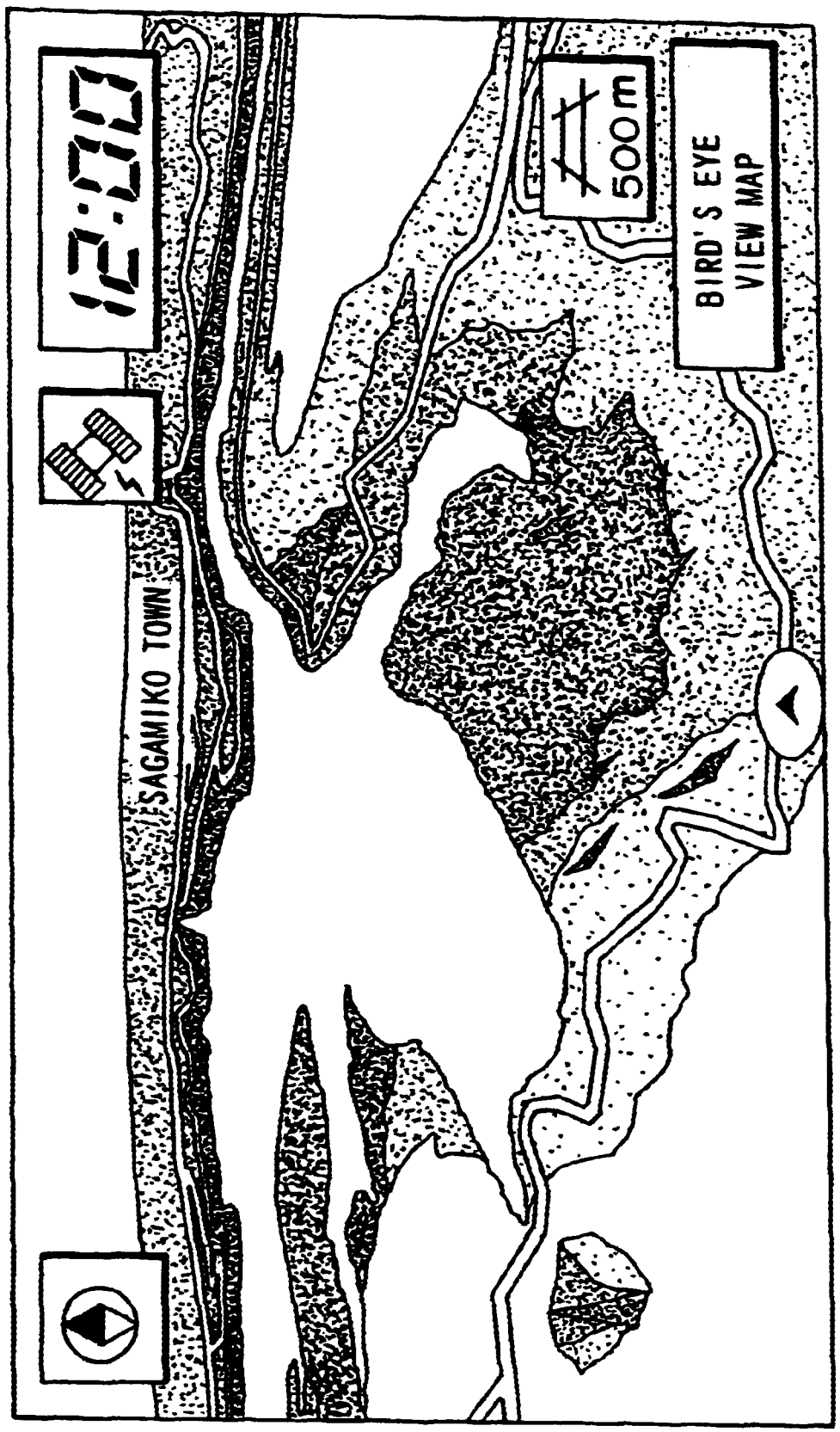
FIG. 11 shows a three-dimensional bird's eye view map displayed on the monitor screen.

Through this gradation calculation and drawing processing, the inside of the quadrangular area or the inside of the triangular areas TR1 and TR2 enclosed by the points Q0 through Q3 in FIG. 9 are displayed in gradation in correspondence to heights to achieve a sense of three dimensions. In other words, through gradation display achieved by painting the inside of the rectangle in a single color if the points at the four corners of the rectangle all have the same height and by dividing the quadrangle into two or three triangles if the heights at the four corners are different to change the pixel colors within the individual triangles, a three-dimensional bird's eye view map with three-dimensional roads, as illustrated in FIG. 8, lakes and the like superimposed upon a three-dimensionally displayed ground level is displayed on the monitor, as illustrated in FIG. 11. As a result, a bird's eye view map with the ground level displayed as a flat surface in the prior art is displayed with elevations and depressions in correspondence to the heights of the individual points to achieve a realistic image with a enhanced sense of three dimensions.

It is to be noted that while the explanation has been given above on the plane PL0 or TR1 and TR2 enclosed by the points Q0 through Q3, for purposes of convenience, the shapes of these planes are not displayed on the monitor screen and that these planes are only used to achieve three-dimensional display of the ground surface in the bird's eye view map through gradation display of the areas within these planes.

Next, the colors that are used in the gradation display are explained. Since the differences in elevation of the map displayed on a given screen varies, if gradation display is implemented by changing the colors with a predetermined elevation difference pitch, the number of gradations will be small when the difference in elevation is small, making it difficult to achieve three-dimensional display. Thus, in this embodiment, the same number of gradations is maintained for every screen, regardless of the differences in elevation (differences among height data corresponding to individual areas) in the following manner to achieve an enhanced three-dimensionality in the display.

Figure 29:
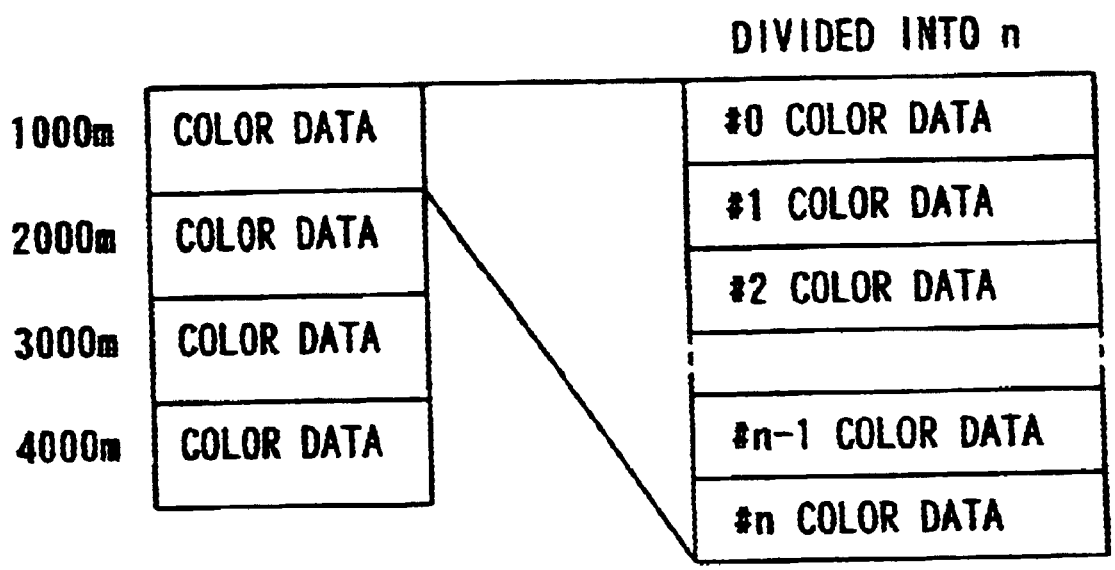
FIG. 29 illustrates the color data table.

FIG. 29 illustrates the color data table. #0 color data through #n color data are assigned as color data for each of the four height ranges, i.e., height 0 through 1000 m, height 1000 m through 2000 m, height 2000 m through 3000 m and height 3000 m through 4000 m. Namely, the number of color data representing an elevation difference of 1000 m is n and a height Ch corresponding to one color data (a predetermined and fixed gradation pitch) is expressed as 1000/(n+1) (m). It is to be noted that a different set of colors is used to represent the #0 through n color data assigned to each of the four height ranges. Consequently, 4×(n+1) colors are used in correspondence to altitudes. However, in this embodiment, a specific number of colors from the 4×(n+1) colors are taken out and registered at color palettes and drawing in color is implemented via the color palettes.

Figure 31:
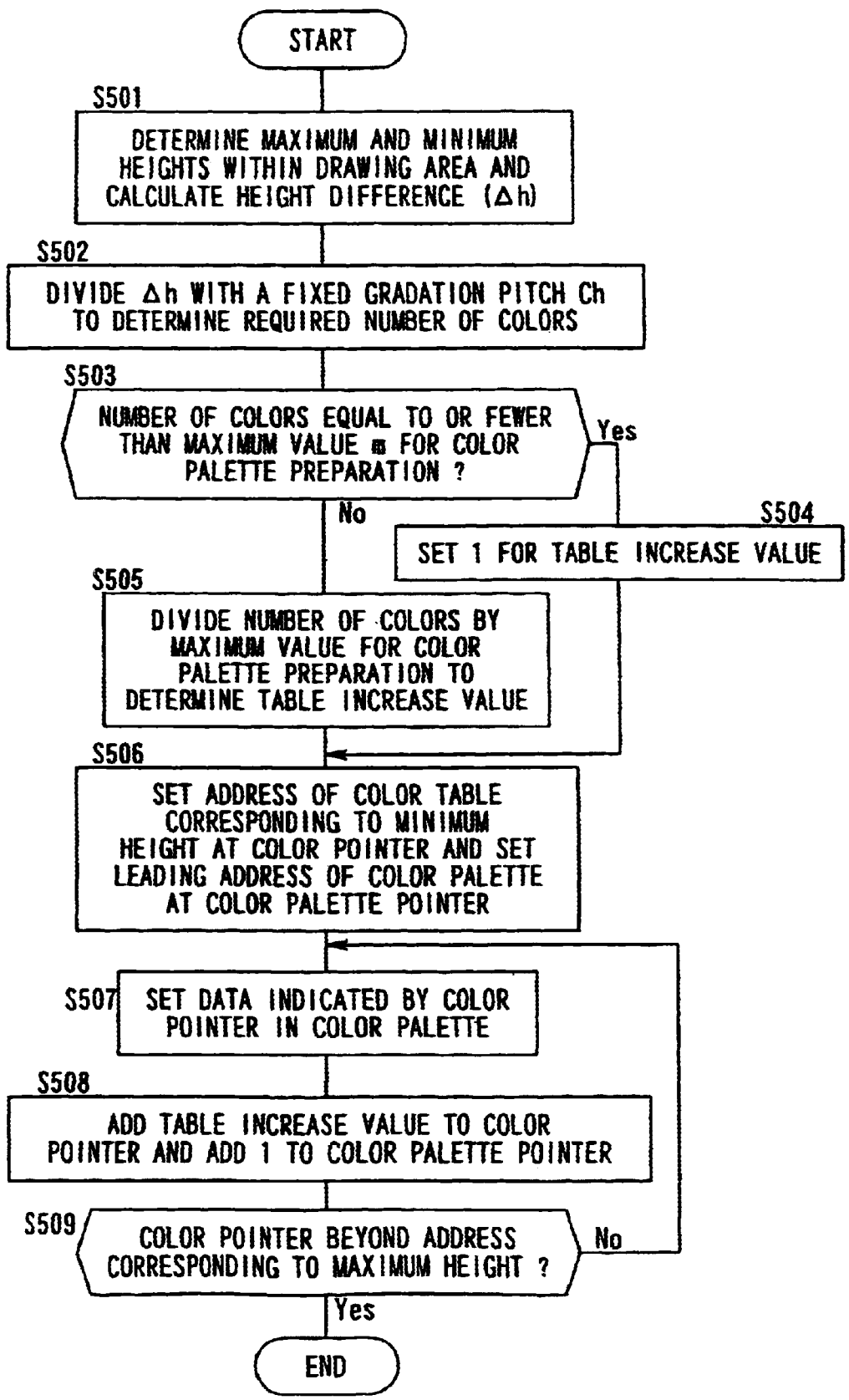
FIG. 31 is a flowchart of the processing for creating color palettes.

FIG. 31 presents a flowchart of the processing for preparing the color palettes. The maximum value for the number of color palettes to be used in this embodiment is set at m (<n). First, in step S501, the maximum height and the minimum height among the plurality of small areas within the drawing area are ascertained and the difference Ah in height is calculated. In step S502, the difference Ah between the minimum height and the maximum height is divided by the height (fixed gradation pitch) Ch per color data to determine the number of colors that are required. In step S503, a decision is made as to whether the number of colors thus ascertained is larger or smaller than the maximum value m for the number of color palettes that can be prepared. If the number of colors is equal to or smaller than m, the operation proceeds to step S504, to set the table increase value to 1. The number of colors being equal to or smaller than m means that m sets of color data can be selected with the fixed gradation pitch explained earlier sequentially starting with the color data representing the minimum height to be respectively set in m color palettes.

If it is decided that the number of colors is larger than m, the operation proceeds to step S505 to ascertain the table increase value by dividing the number of colors that has been determined with the maximum value m for the number of color palettes to be prepared. The value is rounded up to the integer. The number of colors that are required being larger than m means that due to the restrictions imposed upon the number of color palettes, drawing cannot be implemented by changing colors in the fixed gradation pitch Ch units. Thus, colors are selected from the color table in correspondence to the table increase value through the procedure described below and are registered at the color palettes.

In step S506, the address at the color table corresponding to the minimum height determined in step S501 is set at a color pointer, and a leading address of the color palettes is set at a color palette pointer. In step S507, the color data indicated by the color pointer are set at the color palette specified by the color palette pointer. In step S508, the table increase value that has been calculated in step S504 or step S505 is added to the color pointer and one is added to the color palette pointer. In this context, the added value of one means that the address of an adjacent data area is set. A decision is made in step S509 as to whether or not the color pointer has exceeded the address corresponding to the maximum height determined in step S501. If it is decided that the color pointer as not yet exceeded it, the operation returns to step S507 to repeat the processing. If it is decided the color pointer has exceeded it, the processing ends with the registration (assignment) of the colors corresponding to heights from the minimum height through the maximum height within the drawing area at the color palettes completed.

It is to be noted that when data to be selected lie astride color data corresponding to two height ranges in FIG. 29, too, a specific number of color data are selected from the individual sets of height range data. For instance, when the data lie astride the 0 through 1000 m range and the 1000 through 2000 m range, #n−1 color data and #n color data are selected from the 0 through 1000 m height range color data, and #0 color data through #3 color data are selected from the 1000 m through 2000 m height range color data.

Next, division of the display area in the bird's eye view map display is explained. In the bird's eye view map display, the monitor screen is divided vertically into 2 through 4 portions and the volumes of data to be used for display in the individual areas vary. In other words, since the vicinity of the vehicle position is displayed in a large format, roadmap data that are not scaled down to a great degree (a large value of reduced scaling factor) are used (e.g., a level 1 map), whereas roadmap data that are scaled down to a great degree (a small value of reduced scaling factor) are used (e.g., a level 2 map) to display a wide range of areas in an upper portion of the screen. Thus, different roadmap data are used in the upper and lower areas to be used in the processing for the three-dimensional display explained earlier. As a result, there are concerns that the gradation display may become disconnected at the boundary of the upper and lower areas and that a road drawn based upon the three-dimensional road data table may become disconnected.

To deal with these problems, the following measures are taken in the embodiment. Now, an explanation is given in reference to FIGS. 12 through 15.

Figure 12:
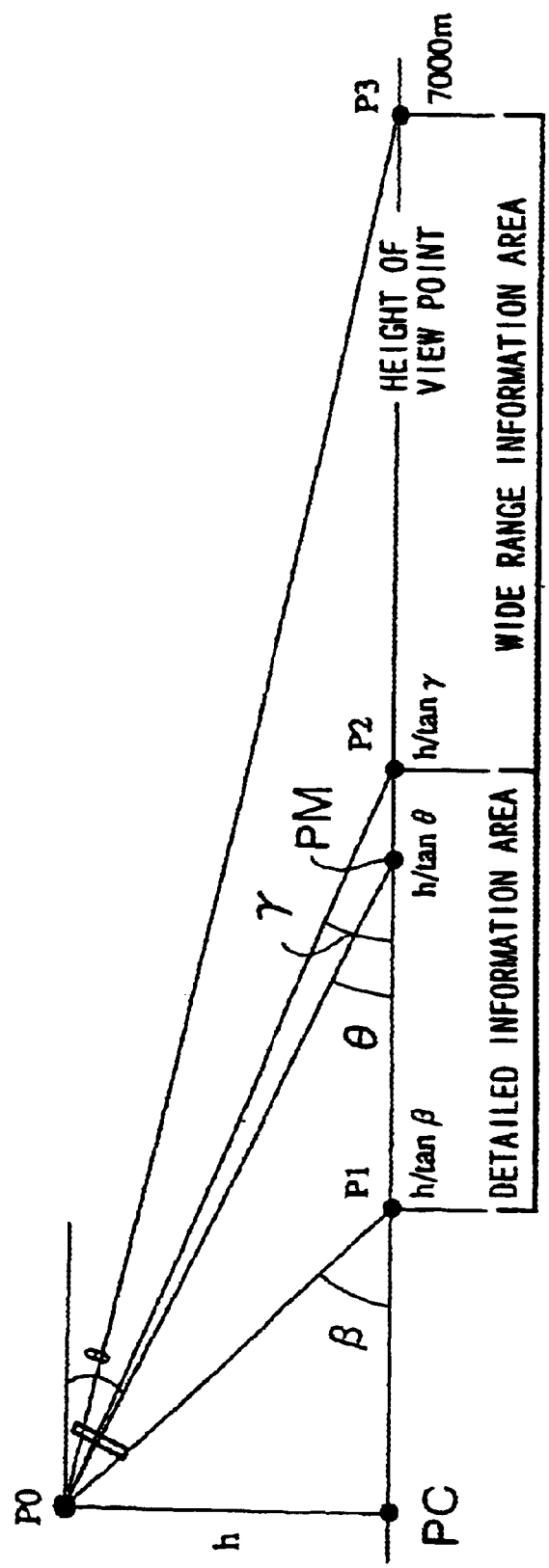
FIG. 12 illustrates area division when the heights of the ground levels are not taken into consideration (static drawing)
Figure 13:
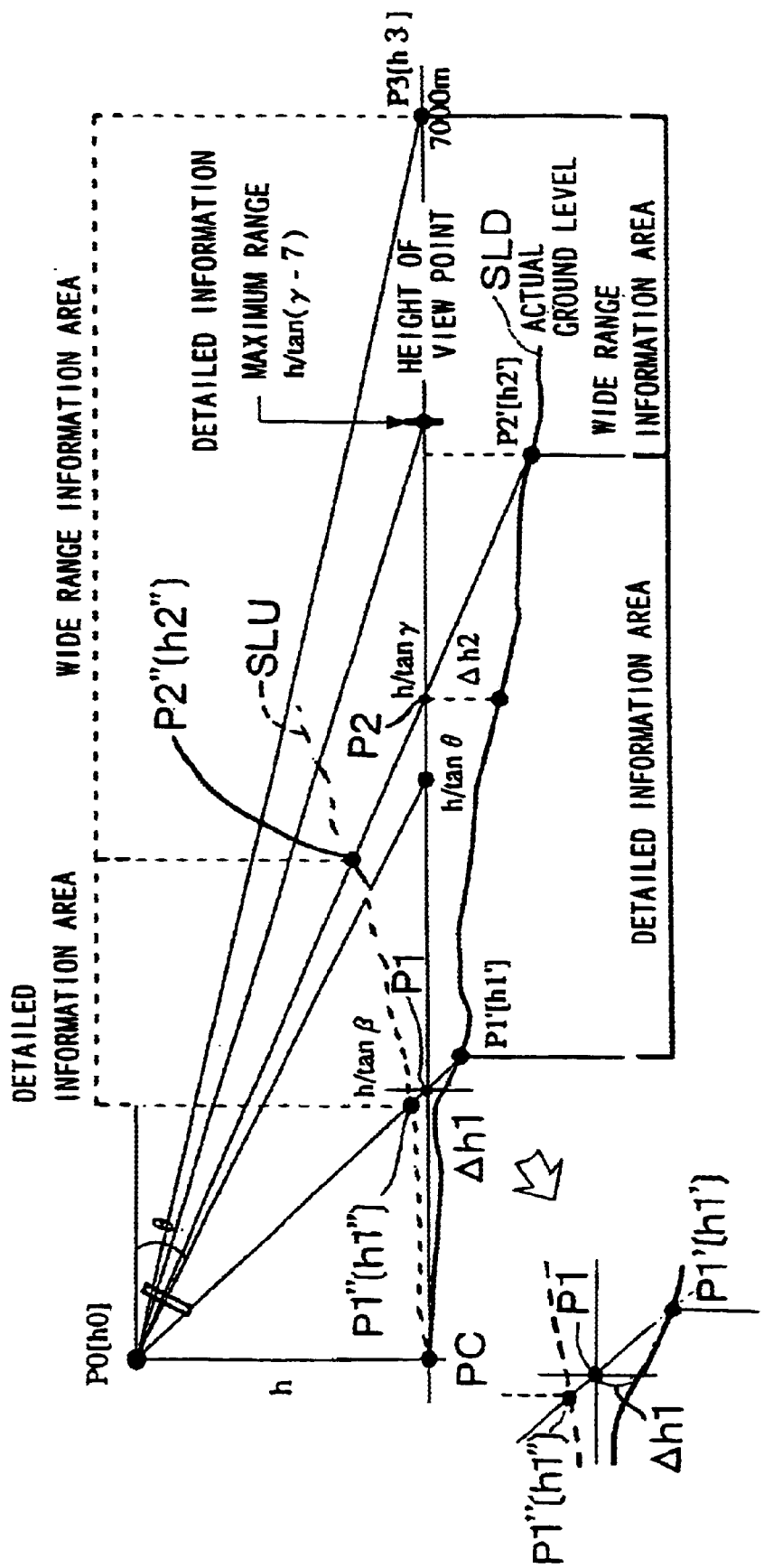
FIG. 13 illustrates area division when the heights of the ground levels are taken into consideration (dynamic drawing)

FIG. 12 illustrates area division implemented when differences in elevation of the ground level are not taken into consideration (static drawing), and FIG. 13 illustrates the area division implemented when differences in elevation of the ground level are taken into consideration (dynamic drawing). In FIG. 12, P0 indicates the viewpoint in the bird's eye view method, P1 indicates the position of the boundary on the map which corresponds to the lowermost position on the monitor screen, P2 indicates the position on the boundary on the map that corresponds to the position at which the monitor screen is divided into separate areas, P3 indicates the position of the boundary on the map that corresponds to the uppermost position of the monitor screen and PM indicates the point on the map that corresponds to the center of the monitor screen. It is to be noted that the vehicle is currently located at a position between the points P1 and P2, which is closer to P1.

The viewpoint P0 is located 350 m above the ground, directly above a point PC which is 350 m to the rear of the vehicle position. The lowermost position P1 on the screen is a point of intersection with the ground level (at the same height as that at the point PC) when the ground is seen looking down from the point P0 at a line of sight angle (looking down angle) β (=52 degrees), the central position PM of the screen is a point of intersection with the ground level (at the same height as that at the point PC) when the ground is seen looking down from the viewpoint P0 at a line of sight angle θ (=23 degrees), the area division position P2 is a point of intersection with the ground level (at the same height as that at the point PC) when the ground is seen looking down from the viewpoint P0 at a line of sight angle γ (=20 degrees) and the uppermost position P3 on the screen is the position at the ground level (at the same height as that at the point PC) which is distanced from the point PC by 7000 m in the vehicle advancing direction.

As explained above, in the static drawing which does not take into consideration differences in elevation of the ground level, the area ranging from the area division position P2 to the screen lowermost position P1 constitutes a detailed information area and the area ranging from the area division position P2 to the screen uppermost position P3 constitutes a wide range information area. For instance, when map data are classified into six levels, i.e., levels 1 through 6, a bird's eye view map is drawn using the level 1 data in the detailed information area, whereas the level 2 data are used to draw a bird's eye view map in the wide range information area.

Next, in reference to FIG. 13, dynamic drawing is explained. When the actual ground level slopes downward from the point PC, which is 350 m rearward of the vehicle position, in the direction in which the vehicle is advancing, as indicated with the solid line SLD, a screen lowermost position P1', which is the point of intersection with the ground level when the ground is seen looking down from the viewpoint P0 at a line of sight angle β, will be located further toward the direction in which the vehicle is advancing relative to the screen lowermost position P1 in the static drawing. The area division position P2' that is the point of intersection with the ground level when the ground is seen looking down from the viewpoint P0 at a line of sight angle γ, too, will be located further toward the vehicle advancing direction relative to the area division position P2 in the static drawing.

When the actual ground level slopes upward in the vehicle advancing direction from the point PC, which is 350 m rearward of the vehicle position, as indicated with the dotted line SLU, a screen lowermost position P1" that is the point of intersection with the ground level when the ground is seen from the viewpoint P0 at a line of sight angle β will be located further toward the viewpoint relative to the screen lowermost position P1 in the static drawing. An area division position P2", which is the point of intersection with the ground level when the ground is seen from the viewpoint P0 at a line of sight angle γ, too, will be located further toward the viewpoint relative to the area division position P2 in the static drawing.

When expressing elevations and depressions in the ground level based upon height data of the ground level (when a three-dimensional bird's eye view map is displayed) in this manner, it is necessary to determine a detailed information area and a wide range information area in correspondence to the height data calculated through the process described earlier. The processing implemented when the height of the ground level is smaller than the height at the point PC at 350 m rearward of the vehicle position and the processing implemented when it is larger than the height at the point PC are separately explained below.

Figure 14:
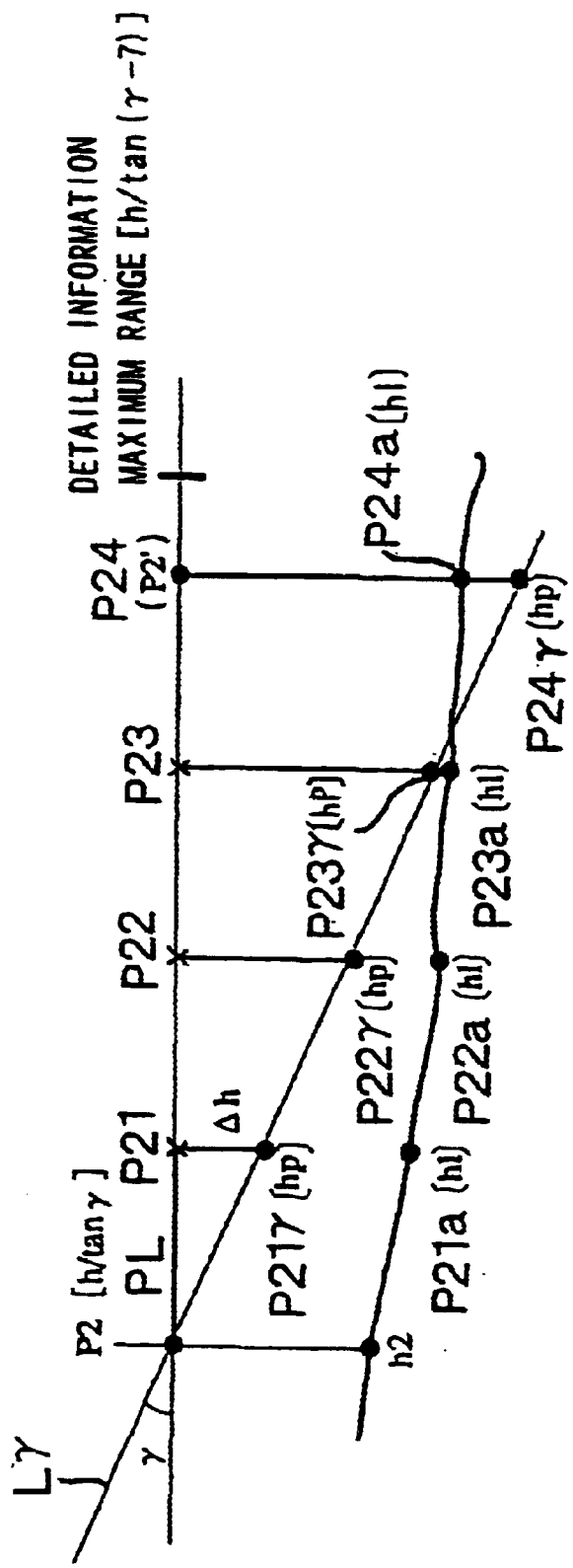
FIG. 14 illustrates area surface division in a downhill slope in dynamic drawing.

In FIG. 14, $L_{\gamma l}$ indicates the line of sight with the ground surface seen from the viewpoint P0 at a line of sight angle γ, with the area division position P2 being the point of intersection with the ground level whose height is the same as that at the point PC. The height change Δh occurring at the line of sight L γ at a point P21, which is distanced from the division position P2 by a specific distance PL in the vehicle advancing direction, is calculated through:

$$\Delta h = PL \times \tan \gamma \quad (13)$$

and the height hp at a point P21 γ on the line of sight Lγ is calculated through:

$$hp = h0 - n \times \Delta h \quad (14)$$

It is to be noted that h0 represents the height at the point PC, and that n is the number of repetitions which is an integer equal to or larger than 1. The height hi at a point P21*a* on the actual ground level corresponding to the point P21 is obtained.

Since the points PC and P21*a* respectively corresponding to h0 and h1 are each contained in a mesh, the height data for the individual meshes calculated through the process described above can be used as h0 and h1.

Next, h1 and hp corresponding to the point P21 are compared. If h1 is larger, the point P21 at that point in time is set as the area division position P2'. If, on the other hand, h1 is smaller, h1 and hp are calculated for a point P22 γ and a point P22a corresponding to a point P22 distanced from the point P21 by the specific distance PL for comparison. Then, in a similar manner, if h1 is larger, the corresponding point P22 is set as an area division position P2'. If, on the other hand, h1 is smaller, h1 and hp are calculated for points P23γ and P23a corresponding to a point P23 distanced from the point P22 by the specific distance PL in a similar manner to compare them against each other.

h1 and hp are calculated sequentially for a point P2nγ (n is the number of repetitions which is an integer equal to or larger than 1) and a point P2na (n is the number of repetitions which is an integer equal to or larger than 1), and if h1 is larger, the corresponding point P2n (n is an integer equal to or larger than 1) is set as the area division position P2'. In the case illustrated in FIG. 14, a point P24 is set as the area division position P2'.

Figure 15:
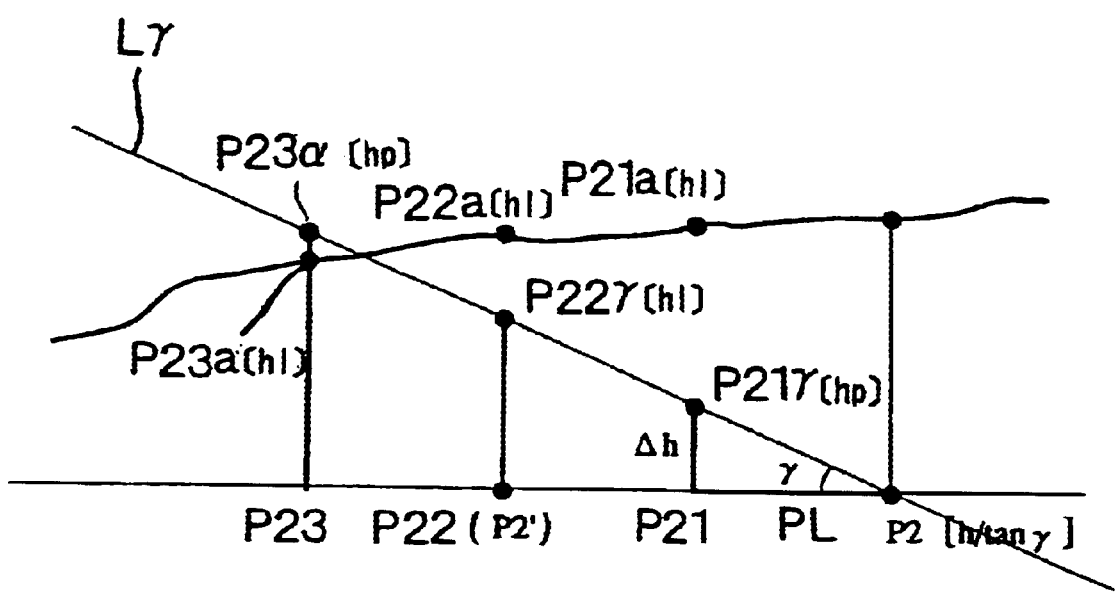
FIG. 15 illustrates area surface division in an uphill slope in dynamic drawing.

In FIG. 15, Lγ is the line of sight with the ground level seen from the viewpoint P0 at a line of sight angle γ, and the area division position P2 constitutes the point of intersection with the ground level having a height equal to that at the point PC. The height change Δh occurring at the line of sight Lγ at a point P21 which is distanced from the division position P2 by the specific distance PL toward the point PC, is calculated through:

$$\Delta h = PL \times \tan \gamma \qquad (15)$$

sand the height hp at a point P21γ on the line of sight Lγ is calculated through:

$$hp = h0 + n \times \Delta h \qquad (16)$$

It is to be noted that h0 represents the height at the point PC and n is the number of repetitions which is an integer equal to or larger than 1. In addition, a height h1 at a point P21a on the actual ground level corresponding to the point P21 is obtained.

Since the points PC and P21a respectively corresponding to h0 end h1 are each contained in a mesh, the height data for the individual meshes calculated through the process described above can be used as h0 and h1.

Next, h1 and hp corresponding to the point P21 are compared. If h1 is smaller, the preceding point P2 is set as the area division position P2'. If, on the other hand, h1 is larger, h1 and hp are calculated for a point P22γ and a point P22a corresponding to a point P22 distanced from the point P21 by the specific distance PL for comparison. Then, in a similar manner, if h1 is smaller, the immediately preceding point P21 is set as an area division position P2'. If, on the other hand, h1 is larger, h1 and hp are calculated for points P23γ and P23a corresponding to a point P23 distanced from the point P22 by the specific distance PL in a similar manner to compare them against each other.

h1 and hp are calculated sequentially for a point P2nγ (n is the number of repetitions which is an integer equal to or larger than 1) and a point P2na (n is the number of repetitions which is an integer equal to or larger than 1), and if h1 is smaller, the immediately preceding point P2n −1 (n is an integer equal to or larger than 1) is set as the area division position P2'. In the case illustrated in FIG. 15, the point P22 is set as the area division position P2'.

By changing the area division position in consideration of the height of the ground level in this manner, it is ensured that the image does not become disconnected in the vicinity of the boundary of the detailed information area and the wide range information area when elevations and depressions of the ground surface are expressed.

It is to be noted that since the area division position P2 becomes located further forward in the vehicle advancing direction on a downhill slope as the difference in elevation increases, the detailed information area becomes too large relative to the size of the wide range information area unless a degree of restriction is imposed in regard to the division position. Thus, in this embodiment, a restriction is achieved by regulating the maximum value for the position.

Figure 36:
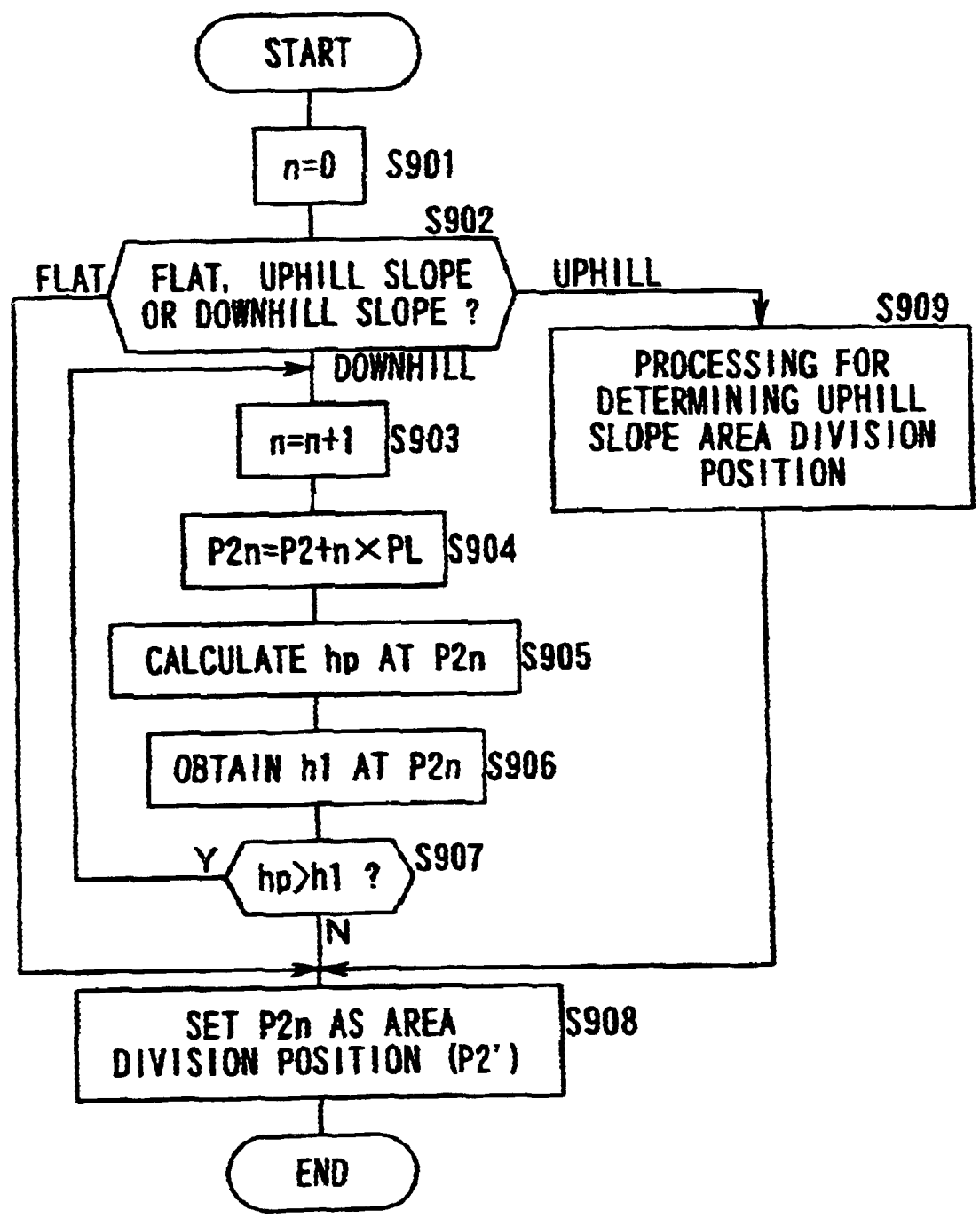
FIG. 36 is a flowchart of the control implemented for determining the area division position in dynamic drawing.

FIG. 36 is a flowchart of the control through which the area division position in dynamic drawing is determined based upon the concept described above. This processing, which is executed at the control circuit 3 in FIG. 1, is started on the condition that the vehicle position has been detected and that positional data (positional coordinates) corresponding to the points PC, P2 and the like in FIGS. 12 and the like have been determined based upon the vehicle position. In addition, the following explanation of the flowchart is given by referring to the reference numbers used in FIGS. 12 through 15.

First, in step S901, the variable n is set at n=0. A decision is made in step S902 to determine that the ground level extending from the point PC to the point P2 is flat, an uphill slope or a downhill slope. More specifically, the ground level height data corresponding to the position of P2 and the height data corresponding to the point PC are obtained, and it is decided that the ground level is an uphill slope if the ground level height data corresponding to the position of P2 indicate a value larger than that indicated by the height data corresponding to the point PC, a downhill slope if the value is smaller and a flat surface if the value is equal. Since the points P2 and PC are each contained in one of the meshes, the ground level height data corresponding to the position of P2 and the height data corresponding to the point PC are obtained based upon the height data of the corresponding meshes described earlier.

If the ground level is determined to be a downhill slope in step S902, the operation proceeds to step S903 to add one to the variable n. In the following explanation, the reference numbers in FIG. 14 are used for reference. In step S904, the position of the point which is distanced from P2 by a distance achieved by multiplying the specific distance PL by n, further away from PC is determined. This position, which is referred to as P2n, may be determined through P2n=P2+ n×PL. In step S905, the height hp at a point P2nγ on the line of sight Lγ at this point P2n is calculated through a Expression (14) presented earlier. In step S906, the height h1 of the ground level P2na at the point P2n is determined. This may be calculated based upon the height data of the mesh corresponding to P2n whose positional coordinates are available.

In step S907, a decision is made as to whether or not the height hp on the line of sight is larger than the height h1 of the ground level. If it is decided that the height hp on the line of sight is larger than the height h1 of the ground level, the operation returns to step S903 to repeat the processing. If, on the other hand, it is decided in step S907 that the height hp on the line of sight is not larger than the height h1 of the ground level, the operation proceeds to step S908. The height hp on the line of sight being larger than the height h1 of the ground level means that the line of sight Lγ has not reached and intersected the downhill-sloped ground surface yet. The height hp on the line of sight being equal to or smaller than the height h1 of the ground level means that the line of sight Lγ has intersected the downhill-sloped ground surface or has passed the level of the ground surface after intersecting it.

In step S908, the position of the point P2n is set as the area division position (P2') to end the processing. In FIG. 14, P24 is set as the new area division position when n=4.

If, on the other hand, the ground level is determined to be flat in step S902, the operation proceeds to step S908 since the area division position does not have to be changed from P2. In step S908, the point P2 is still set as the area division position since n=0.

If it is decided that the ground level is an uphill slope in step S902, the operation proceeds to step S909 to perform processing for determining the area division position in the uphill slope. The processing in step S909 may adopt a method similar to the processing on the downhill slope explained earlier, based upon the concept on a uphill slope explained earlier in reference to FIG. 15, to determine a point at which the line of sight Lγ and the ground surface intersect or the preceding point by performing a search in the reverse direction, i.e., the direction toward the vehicle position. Thus, a detailed explanation is omitted.

By ascertaining the position at which the line of sight Lγ that extends down toward the point P2 corresponding to the area division position on the monitor screen from the viewpoint P0 and passes through the point P2, intersects the ground level which is determined by taking into consideration the height data (a point close to the point of intersection, to be more precise) in this manner, the new area division position P2' can be determined. Then, in reference to this point, the ranges over which the detailed map data and the wide range map data are to be used can be determined. It is to be noted that PC, P2, P2n and P2' mentioned above correspond to points on a straight line drawn, for instance, from the bottom to the top of the screen at the center, and that the area division for map data is implemented by using a horizontal line on the screen that passes through the area division position P2' that has been newly obtained and is perpendicular to the straight line.

Figure 16:
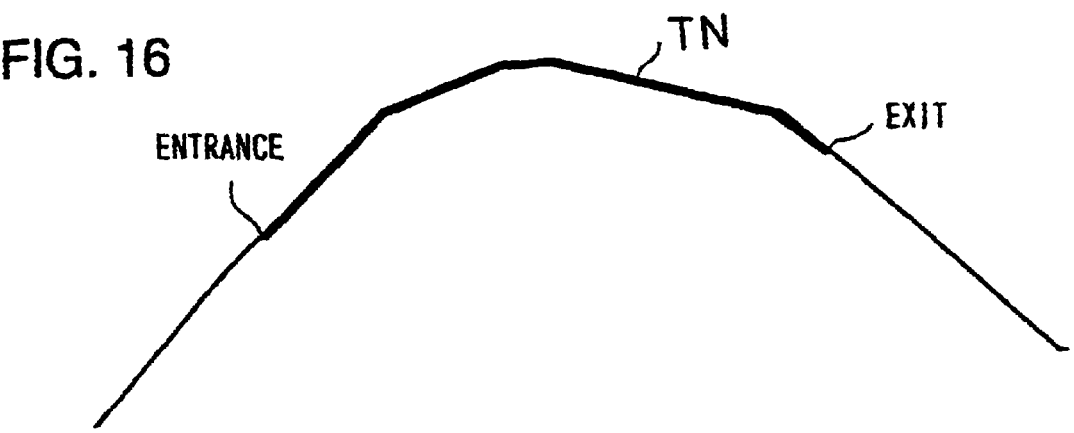
FIG. 16 illustrates problems in the tunnel display.
Figure 17:
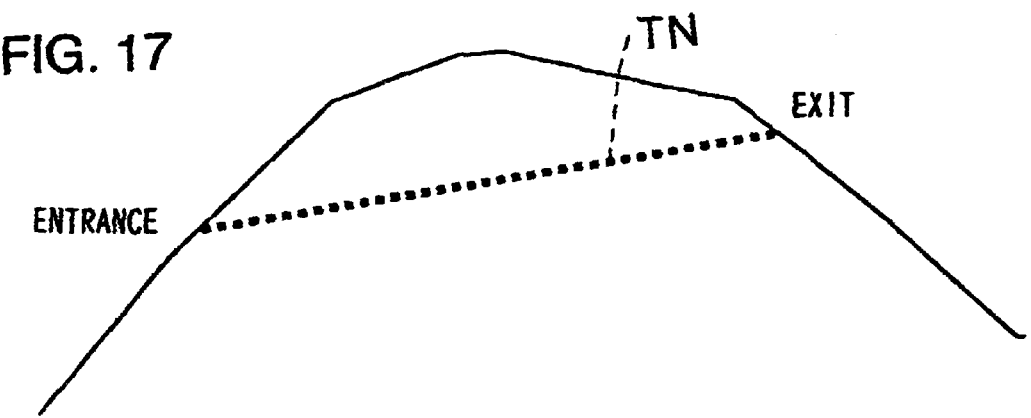
FIG. 17 illustrates the solution to the problems in the tunnel display.

Next, in reference to FIGS. 16 and 17, tunnel display on a three-dimensional bird's eye view map is explained. Tunnel data may be provided as one set of link string data in the road data table in FIG. 5. In this case, by providing a link string attribute data field that indicates a given link string is a tunnel, the link start point and the link end point can be identified as a tunnel entrance and a tunnel exit when a link string is a tunnel. Consequently, as explained earlier, Expressions (1) and (2) are used to determine which secondary mesh areas the tunnel entrance and the tunnel exit are contained in, and their latitudinal direction division numbers and longitudinal direction division numbers are calculated, height data corresponding to the tunnel entrance and the tunnel exit are obtained from the height data table in FIG. 3.

If there are interpolation points between the start point and the end point of a tunnel, the X and Y coordinates of the interpolation points are stored in the road data table as the tunnel link string data. If the heights of the interpolation points are calculated as described earlier, the following problem arises.

Namely, since the height data corresponding to the interpolation points are calculated as height data of interpolation points located on the ground level and if such height data are used to display the tunnel superimposed upon a three-dimensional bird's eye view map through the method explained in reference to FIG. 8, the interpolation points will be set at ground level, which will cause an unnatural display in which the line TN connecting the tunnel entrance and the tunnel exit extends on the surface of the mountain, as illustrated in FIG. 16.

To solve this problem, the heights of the interpolation points inside a tunnel are determined based upon the proportional distribution of the height of the tunnel entrance and the height of the tunnel exit in the embodiment. Namely, if the height data corresponding to the entrance indicate 500 m, the height data corresponding to the exit indicate 1000 m, and interpolation point is located at the middle point of the entrance and the exit, the height data corresponding to the interpolation point will indicate 750 m to display the interpolation point at the height of 750 m. As a result, the tunnel is displayed as a dotted line TN under the ground level, as illustrated in FIG. 17.

Figure 32:
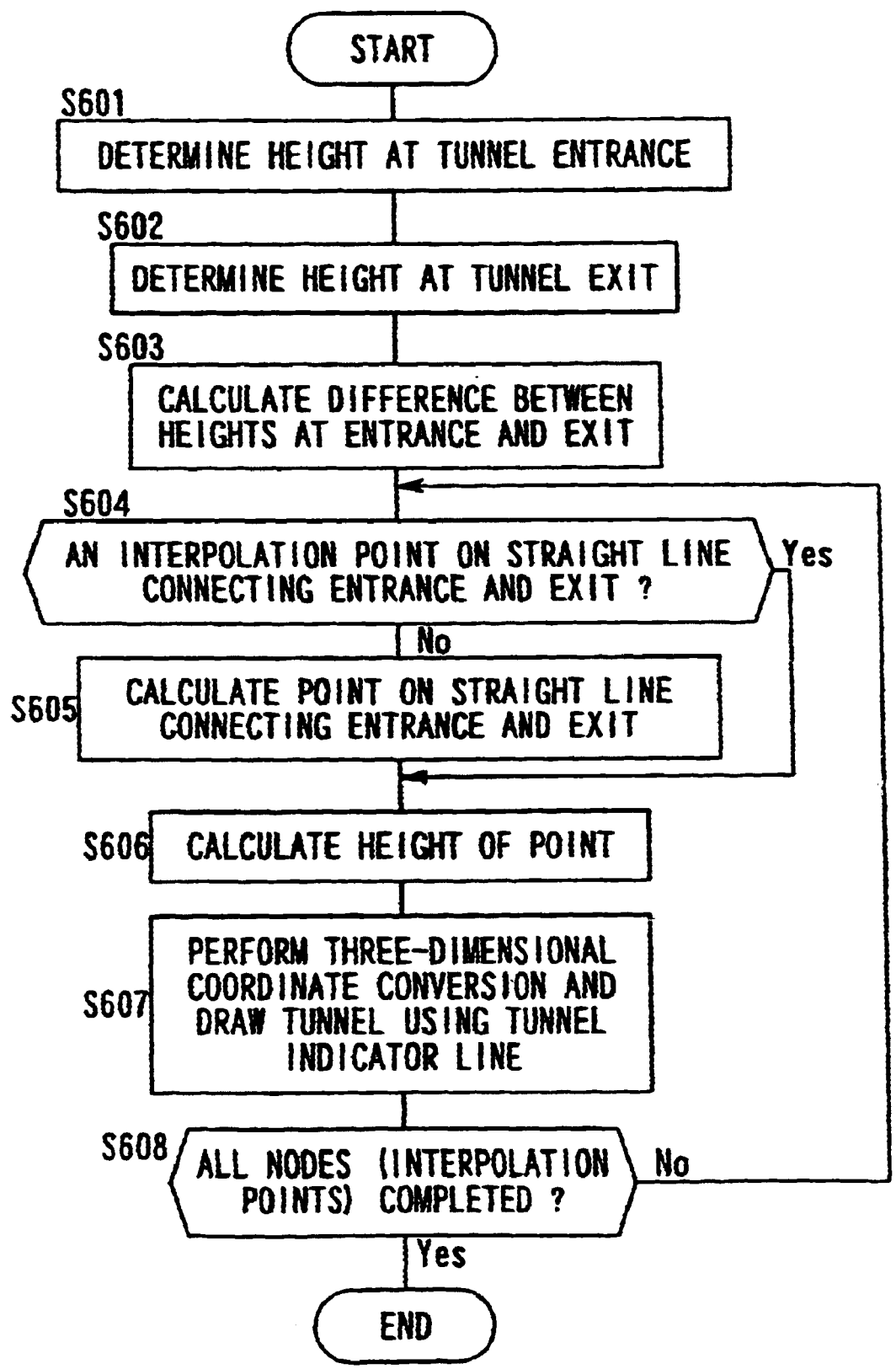
FIG. 32 is a flowchart of the tunnel drawing processing.

The following is an explanation of the tunnel drawing processing in reference to the flowchart in FIG. 32. First, in step S601, the height at the tunnel entrance is determined and in step S602, the height at the tunnel exit is determined. The heights at the tunnel entrance and the tunnel exit are determined using the tunnel link string data and Expressions (1) and (2), as explained earlier. In step S603, the difference between the height at the tunnel entrance and the height at the tunnel exit is determined.

Next, heights of interpolation points located between the tunnel entrance and the tunnel exit are sequentially calculated. First, in step S604, a decision is made as to whether or not a selected interpolation point is located on the straight line connecting the tunnel entrance and the tunnel exit based upon the X, Y coordinate data of the interpolation point. If the interpolation point is determined to be on the straight line, the operation proceeds to step S606, whereas if it is determined to be off the straight line, the operation proceeds to step S605. If it is not on the straight line, calculation is performed in step S605 to determine which point on the straight line connecting the entrance and the exit this particular interpolation point corresponds to. More specifically, the interpolation point is determined to correspond to the point of intersection of the straight line connecting the tunnel entrance and the tunnel exit, and the perpendicular line extended from the coordinates of the interpolation point to the straight line. This processing is adopted based upon the assumption that even if an interpolation point is not on the straight line, its height will be almost equal to the height at the point of intersection of the perpendicular line and the straight line connecting the entrance and the exit.

Then, in step S606, the height of the interpolation point is calculated. If the interpolation point is on the straight line, the coordinates of the point on the straight line are used, whereas if the interpolation point is not on the straight line, the coordinates of the corresponding point on the straight line ascertained in step S605 are used, to determine the distance of the point from the tunnel entrance on the straight line connecting the entrance and the exit, and based upon this distance, the difference in elevation between the entrance and the exit is simply proportionally distributed to determine the height at the point. The height of the interpolation point is thus ascertained. In step S607, 3D coordinate conversion is performed based upon the height data corresponding to the interpolation point thus obtained and the tunnel is drawn using the type of line assigned for tunnels (dotted line in the example presented in FIG. 17) in the bird's eye view method. A decision is made in step S608 as to whether the processing has been completed for all the interpolation points, and if the processing is determined to be incomplete, the operation returns to step S604 to repeat the processing. If, on the other hand, the processing is determined to be complete, the processing ends.

A tunnel is displayed using a dotted line TN to appear to extend under the ground level in the three-dimensional bird's eye view, as illustrated in FIG. 17. While the tunnel is shown as a single straight line in the example in FIG. 17, if the tunnel curves and the state of the curve is indicated by interpolation points, the curve will be displayed through the processing illustrated in FIG. 32. Namely, if a road in a tunnel has a curve in the three-dimensional bird's eye view, the details of the curve will be shown in three-dimensional display which also reflects the actual heights. Since the tunnel will be displayed using a special type of line assigned to tunnels such as a dotted line, it can be easily ascertained that the road that is three-dimensionally displayed is a tunnel running under ground.

Recommended Route Calculation (1) Detailed Information Display

Figure 18:
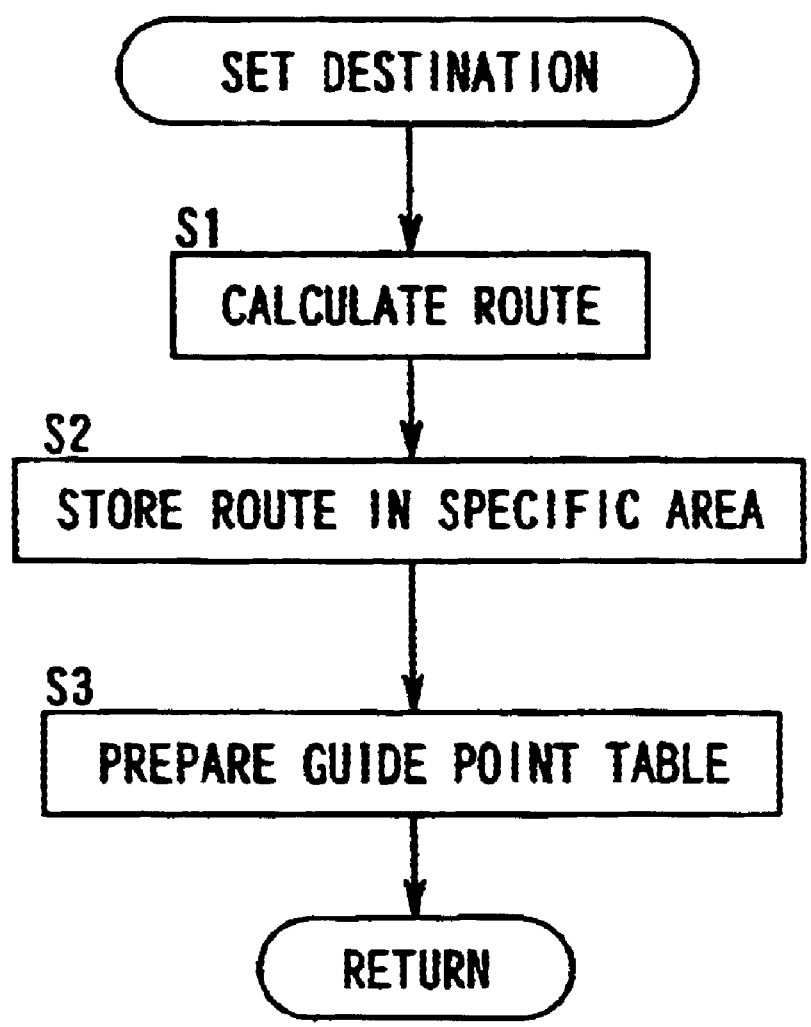
FIG. 18 is a flowchart of the procedure taken in the route search processing.

FIG. 18 is a flowchart of the processing in which a recommended route is set based upon a destination that has been input. In step S1, a recommended route from the current position to the destination is calculated and set. The destination is set by the operator via the input device 4, and the recommended route is automatically set through calculation adopting, for instance, the Dijkstra algorithm in the known art. In this processing, the position detected by the current position detection device can be used as the current position. In step S2, the data corresponding to the recommended route are stored in a specific area of the RAM in a central processing unit 3 to prepare a recommended route data table. In step S3, guidance data corresponding to guide points on the recommended route are stored in the RAM at the central processing unit 3 to prepare a guide point table.

Basically, the recommended route data table is constituted by sequentially storing mesh numbers and link numbers starting from the current position and advancing toward the destination. The guide point table is constituted of data indicating distances from the start point in the recommended route to guide points and data indicating directions in which guidance is given at the individual guide points.

Figure 19:
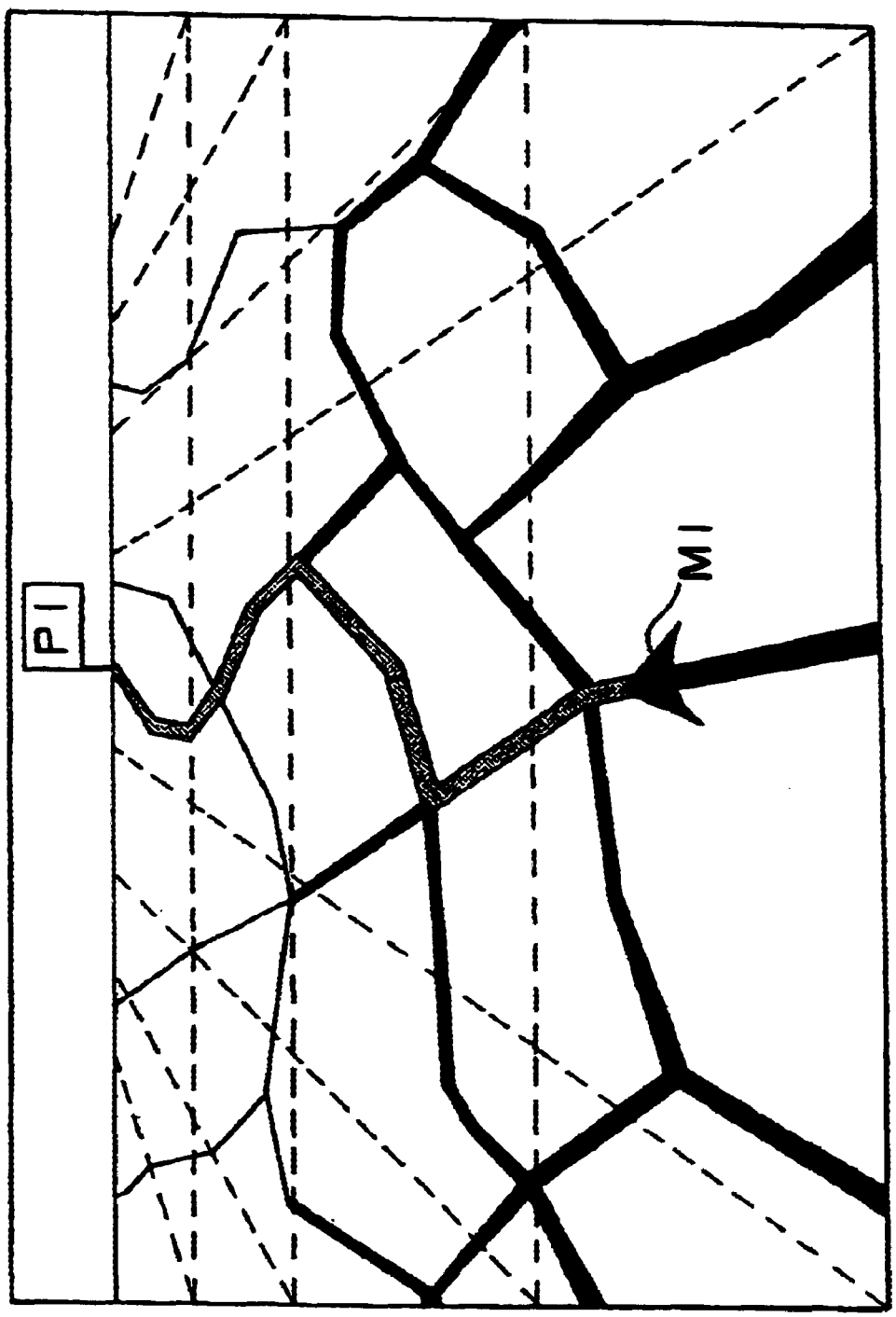
FIG. 19 is the overall route display of the route that has been searched displayed on the bird's eye view map display screen.

FIG. 19 illustrates an example in which the entire route from the start point to the destination is displayed on a bird's eye view map when the route search calculating is completed. The vehicle position mark M1 indicates the start point and the destination flag mark P1 indicates the destination. As FIG. 19 illustrates, when implementing the entire route display of the results of the route search on a bird's eye view map, the destination to be reached through the recommended route that has been calculated is positioned in an upper portion of the bird's eye view map in the central area of the monitor screen.

Figure 20A:
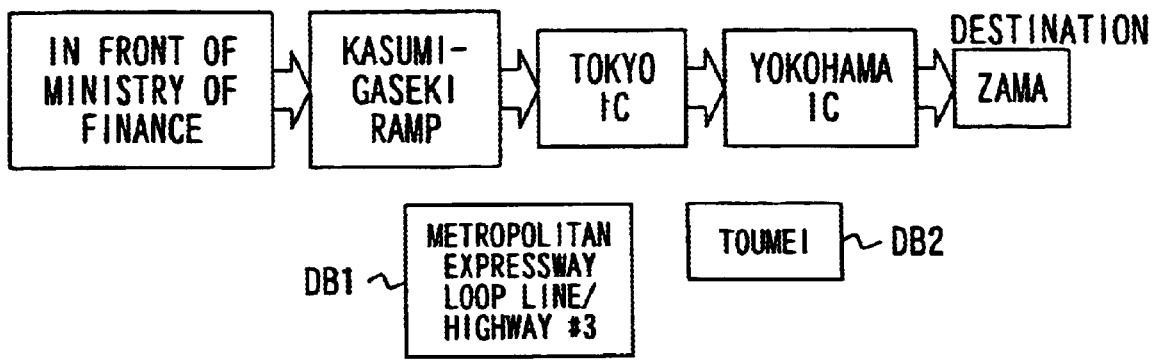
FIGS. 20A through 20C illustrate deformed displays on the monitor screen that schematically present the results of a route search.

FIG. 20A schematically illustrates the deformed recommended route displayed on the monitor screen when the start point is in front of the Ministry of Finance and the destination is Zama. In FIG. 20A, the names of main points or the entrances and exits to expressways between the start point and the destination are enclosed in longitudinal frames and these frames are connected by arrows heading toward the destination.

Figure 20B:
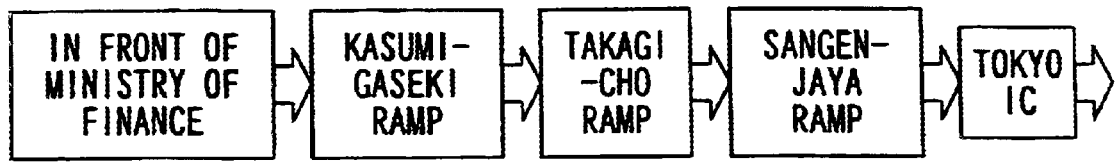
Figure 20C:
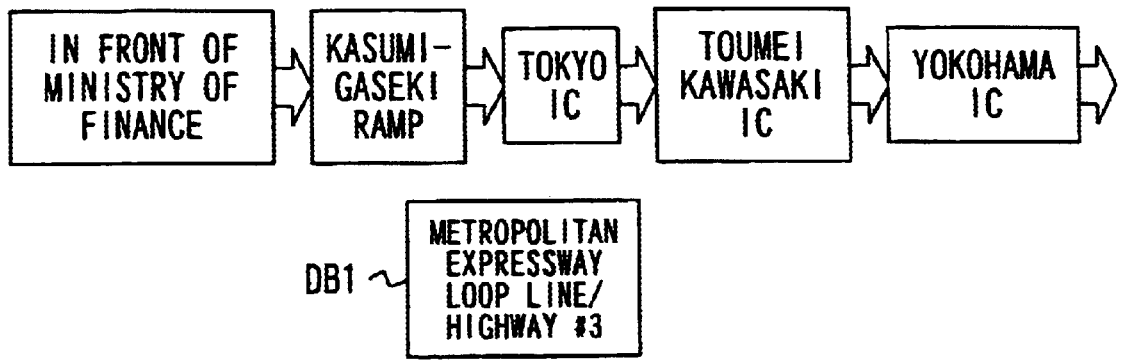

In FIG. 20A, a button DB1 is displayed as a frame which encloses "Metropolitan Expressway Loop Line/Highway #3," between the Kasumigaseki Ramp and the Tokyo Interchange. A button DB2 is displayed as a frame enclosing the "Tomei" between the Tokyo Interchange and the Yokohama Interchange. When, for instance, the button DB1 is operated, the monitor screen is switched to bring up the display shown in FIG. 20B, in which the Takagi-cho Ramp and the Sangenjaya Ramp located between the Kasumigaseki Ramp and the Tokyo Interchange are on display. In this display, the route between the Yokohama Interchange and the destination, Zama, is not displayed. When the button DB2 is operated, the monitor screen is switched to bring up the display illustrated in FIG. 20C, to display the Tomei Kawasaki interchange located between the Tokyo Interchange and the Yokohama Interchange, with the button DB1 remaining on display.

Since characters would be shown too small and would be difficult to read if all the point information were presented schematically in deformation manner when implementing the entire route display of the results of a route search on a single screen, only the main point information is displayed as illustrated in FIG. 20A. However, if it is necessary to verify the route that is being traveled by checking the points the vehicle passes or if it is necessary to plan in advance on a point where a break is to be taken, for instance, the deformed schematic entire route display must be first switched to the entire route display on the map display screen to verify the waypoints or to check on the point of break in the prior art. In contrast, if detailed point information is available, the button mark DB can be displayed in that block, as shown in FIG. 20A, so that when the button DB is operated, the display is switched to the detailed information display screen illustrated in FIG. 20B to eliminate the difficulty of reading in the overall route display and to provide the operator with full information on the waypoints.

(2) Scrolling Point Names

Figure 21A:
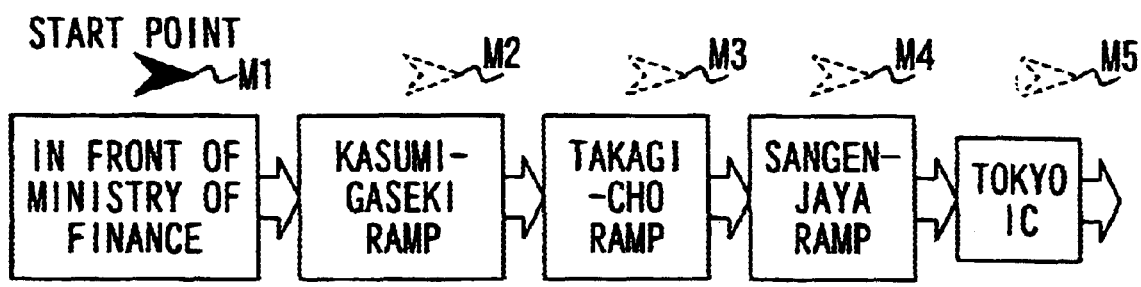
FIGS. 21A through 21D illustrate deformed displays on the monitor screen that schematically present the results of a route search.
Figure 21B:
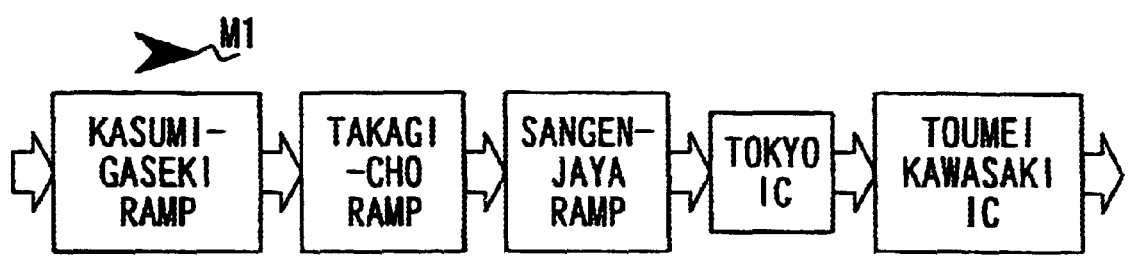
Figure 21C:
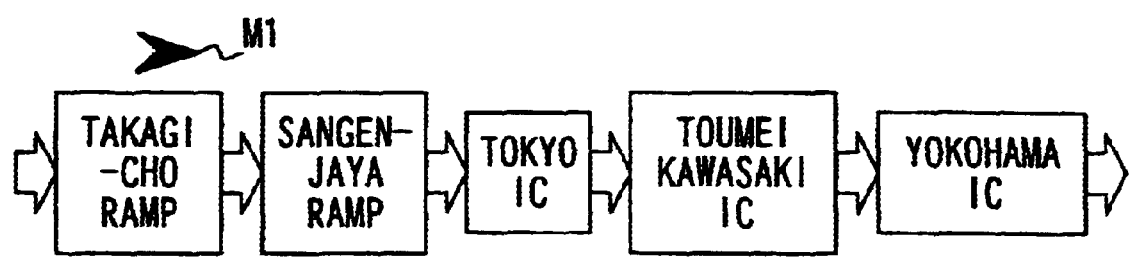

FIGS. 21A through 21C illustrate how the display on the monitor screen changes as the vehicle progresses after it starts to travel from the start point, i.e., in front of the Ministry of Finance for the destination, i.e., Zama, with the entire recommended route displayed, as illustrated in FIG. 20A.

FIG. 21A is the monitor screen immediately after the vehicle starts to travel. The vehicle position mark M1 is displayed above the point information corresponding to the Ministry of Finance, indicating that the vehicle is located in front of the Ministry of Finance which is the start point. In addition, in the example illustrated in FIG. 21A, five point names are displayed at once, and if the vehicle starts traveling with the monitor display illustrated in FIG. 20A, the point names of the five locations including their detailed information are displayed.

Figure 21D:
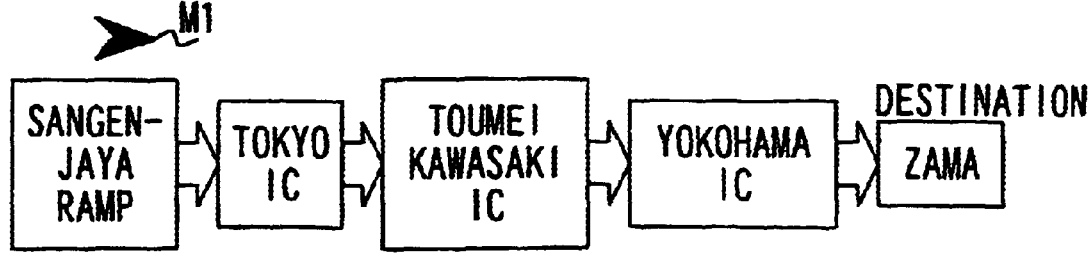

When the vehicle reaches the Kasumigaseki Ramp, the monitor screen is switched from FIG. 21A to FIG. 21B to bring up a display starting with the Kasumigaseki Ramp and ending with the Tomei Kawasaki Interchange. When the vehicle reaches the Takagi-cho Ramp, the monitor screen is switched from FIG. 21B to FIG. 21C to bring up a display starting with the Takagi-cho Ramp and ending with the Yokohama Interchange. When the vehicle reaches the Sangenjaya Ramp, the monitor screen is switched from FIG. 21C to FIG. 21D to bring up a display starting with the Sangenjaya Ramp and ending with Zama, the destination.

It is to be noted that in FIGS. 21A through 21D, when the vehicle reaches the next point information location, the screen is scrolled to the left to switch the monitor screen to display the point information corresponding to the vehicle position at the far left side of the monitor screen with the newest point information displayed at the far right. In other words, the vehicle position mark is always displayed above the point information at the left side of the screen. Instead of this scroll, the vehicle position mark may be displayed above the corresponding point information as indicated with M2, M3, M4 and M5 in FIG. 21A as the vehicle travels, to scroll the display so that when the vehicle position mark is set at the point information at the right side (when the vehicle has reached the Tokyo Interchange, for instance), the display position of the point information (of the Tokyo Interchange) is switched to the left side of the screen.

Figure 22A:
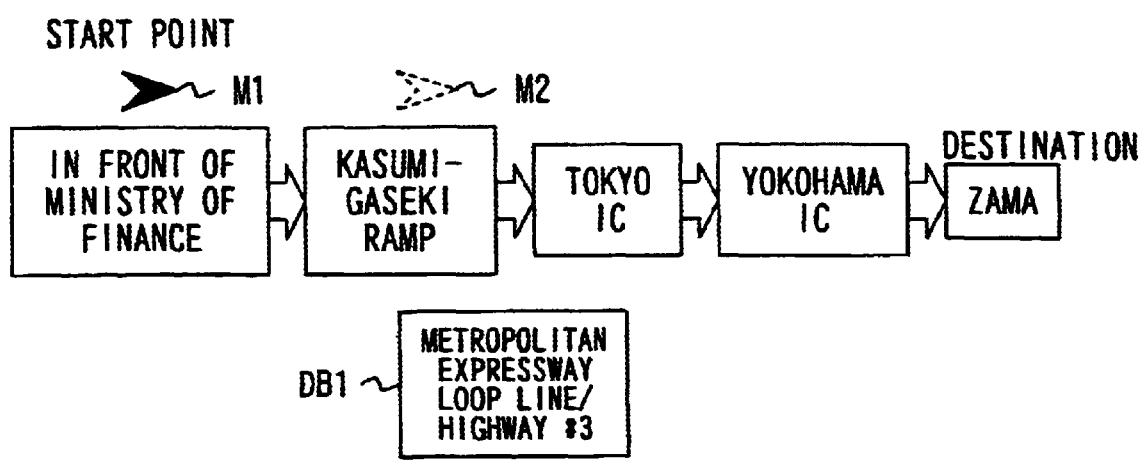
FIGS. 22A through 22B illustrate deformed displays on the monitor screen that schematically present the results of a route search.
Figure 22B:
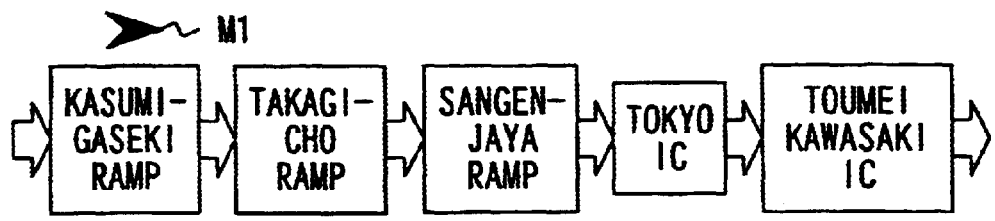

FIG. 22A is the entire route display brought up on the monitor screen after the recommended route calculation is completed and is similar to FIG. 20A. In FIG. 22A, the vehicle position mark is displayed above the point information corresponding to the position in front of the Ministry of Finance, i.e., the start point, and the vehicle position mark is moved as indicated with M1 and M2 as the vehicle travels. When the vehicle reaches the Kasumigaseki Ramp, detailed information, i.e., the Takagi-cho Ramp and the Sangenjaya Ramp located between the Kasumigaseki Ramp and the Tokyo Interchange is newly displayed, as illustrated in FIG. 22B. In addition, the Tomei Kawasaki Interchange located between the Tokyo Interchange and the Yokohama Interchange, too, is newly displayed as detailed information. As in this example, the screen may be automatically switched to route display that includes detailed point information whenever the vehicle travels to reach a point for which such detailed information exists.

(3) Deformed Schematic Display Control Flow

Figure 33:
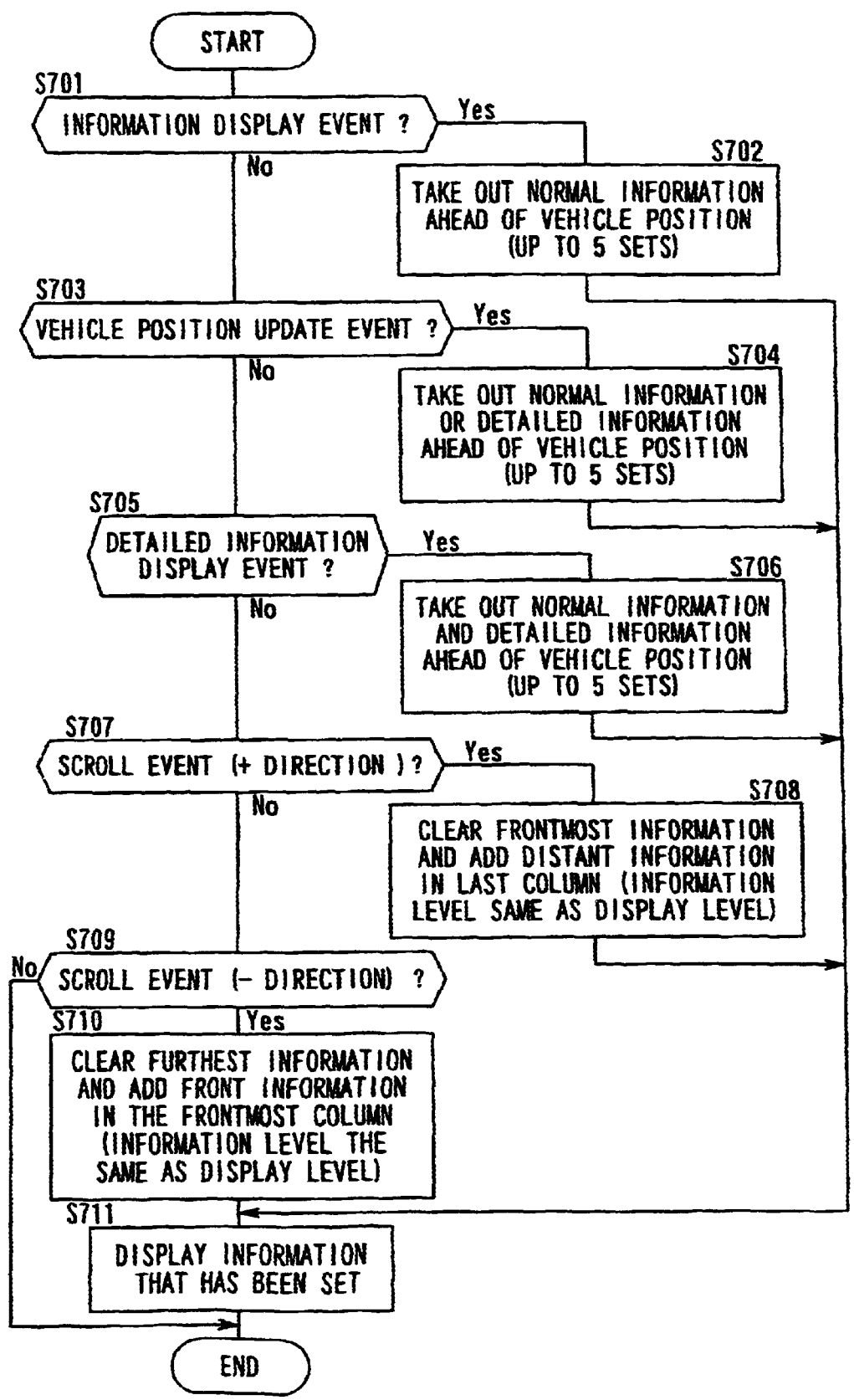
FIG. 33 is a flowchart of the control implemented for deformed schematic route display.

FIG. 33 is a flowchart of the control for implementing the deformed schematic route display described earlier. This routine starts after the route search calculated is completed.

In step S701, a decision is made as to whether or not there has been an information display event, and if it is decided that an information display event has occurred, the operation proceeds to step S702. The information display event in this context refers to an event for displaying deformed schematic normal information. In step S702, up to five sets of deformed schematic normal information ahead of the vehicle position are taken out, and the operation proceeds to step S711 to display their contents. In the example described above, this display corresponds to the display presented in FIG. 20A.

In step S703, a decision is made as to whether or not there has been a vehicle position update event and if it is decided that a vehicle position update event has occurred, the operation proceeds to step S704. The vehicle position update event in this context refers to an event that occurs when the vehicle has moved from a given deformed schematic display position to an adjacent position. In step S704, up to five sets of normal or detailed deformed schematic information ahead of the vehicle position are taken out, and then the operation proceeds to step S711 to display their contents. The vehicle position mark is displayed above the deformed schematic display at the left end. This display corresponds to FIGS. 21A through 21D in the example explained earlier. Since the display mode is set to include detailed information in the display in FIGS. 21A through 21D, up to five sets of information including normal information and detailed information, ahead of the vehicle position, are taken out. If the display mode is set to display only the normal information, up to five sets of normal information ahead of the vehicle position are taken out. It is to be noted that the vehicle position mark alone may be caused to move to the adjacent schematic display upon occurrence of this event. This corresponds to the case explained earlier in reference to the vehicle position marks M2 through M5 indicated with the dotted lines in FIG. 21A.

In step S705, a decision is made as to whether or not there has been a detailed information display event and if it is decided that a detailed information display event has occurred, the operation proceeds to step S706. In step S706, up to five sets of information including the deformed schematic normal information and detailed information related to the event that has just occurred, ahead of the vehicle position, are taken out, and then the operation proceeds to step S711 to display their contents. In reference to the example explained earlier, when the button DB1 or the button DB2 is pressed while the display illustrated in FIG. 20A, for instance, is on the screen, a detailed information display event that corresponds to the button that has been pressed occurs, to bring up the display in FIG. 20B or FIG. 20C. In addition, in the example illustrated in FIG. 22A, too, a detailed information display prevent occurs when the vehicle reaches the Kasumigaseki Ramp.

In step S707, a decision is made as to whether or not there has been a +direction scroll event, and if it is decided that a +direction scroll event has occurred, the operation proceeds to step S707. The +direction scroll event in this context refers to an event that occurs when the scroll switched 4c has been operated by the operator to scroll the deformed schematic display. In step S708, the information at the front-most position is cleared and the information at the following position is added in the last column, then the operation proceeds to step S711 to display the contents. The+direction scroll display refers to display of information ahead of the vehicle traveling toward the destination implemented by scrolling the screen as necessary. The display mode is scrolled based upon the contents of the normal information if only normal information is displayed and it is scrolled based upon the contents of detailed information if the display includes detailed information.

In step S709, a decision is made as to whether or not there has been a –direction scroll event and if it is decided that a –direction scroll event has occurred, the operation proceeds to step S707. The –direction scroll event in this context refers to an event that occurs when a scroll button (not shown) has been operated by the operator to scroll back the deformed schematic display in the direction toward the vehicle position. In step S710, the information in the last column is cleared and the information that immediately precedes it is added in the front-most row, then the operation proceeds to step S711 to display the contents. The –direction scroll display refers to scroll display for reversing the deformed schematic display from the direction of the destination toward the direction of the vehicle position. The display mode is scrolled based upon the contents of normal information when only normal information is displayed and it is scrolled based upon the contents of the detailed information if the display includes detailed information, as in the case explained above.

The processing ends when the display processing is completed in step S711 or if none of the events described above has occurred. This routine is called up as necessary through a specific routine to be executed repeatedly.

Screen Display Switching

Figure 23A:
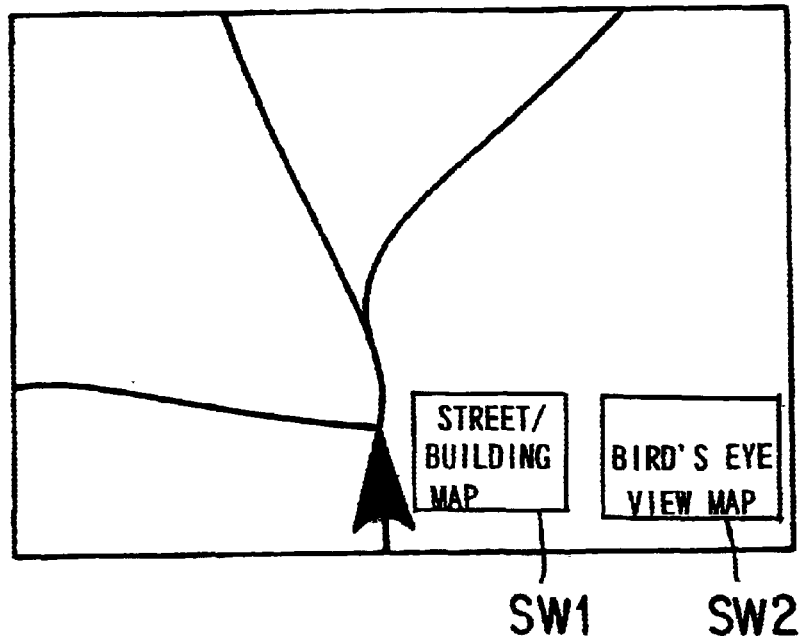
FIGS. 23A through 23D show four display screens.
Figure 23B:
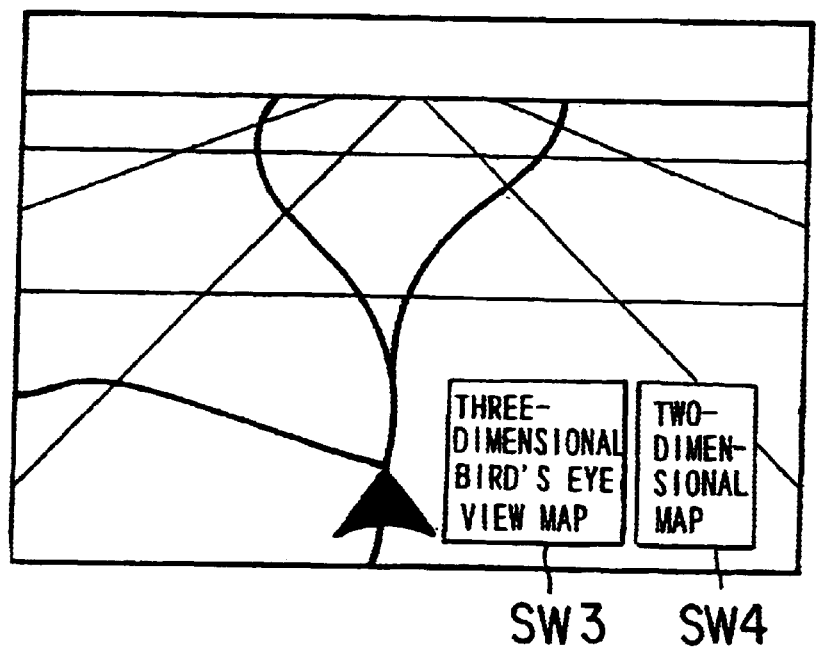
Figure 23C:
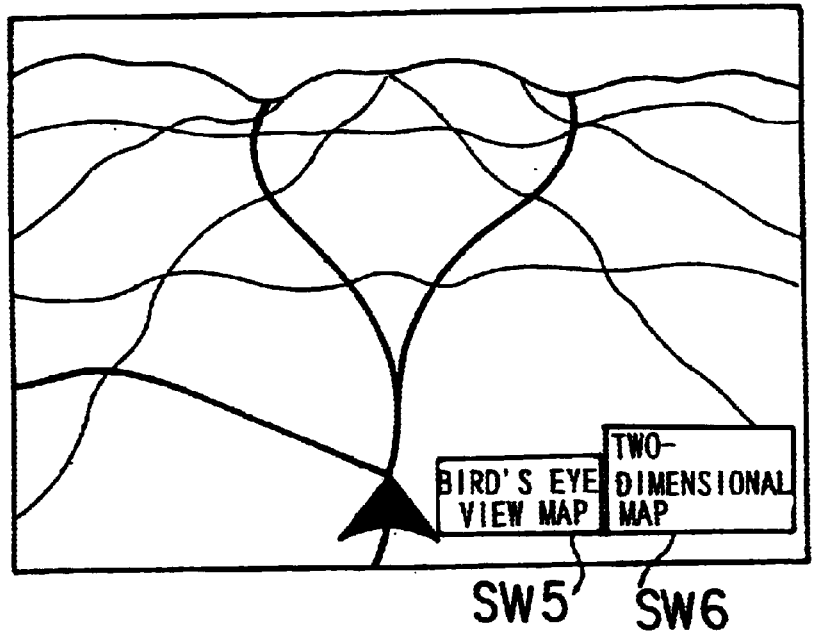
Figure 23D:
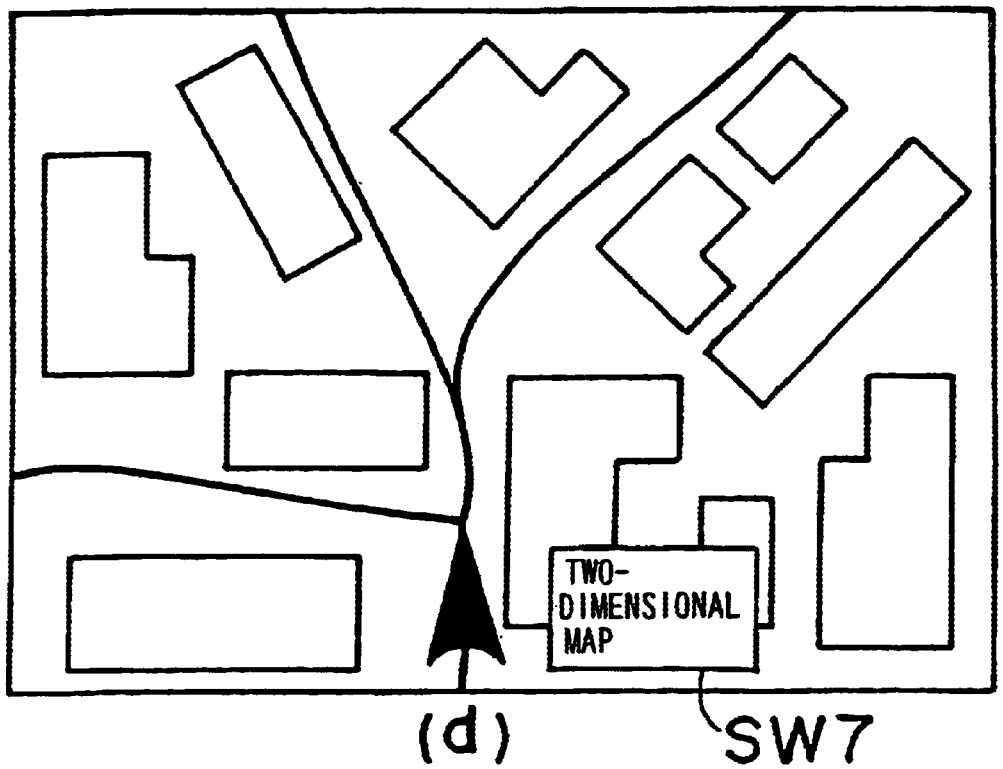

FIGS. 23A through 23D present examples of display screens in four display modes, that are displayed on the monitor screen. FIG. 23A shows a two-dimensional map, FIG. 23B shows a bird's eye view map achieved by converting the two-dimensional map into a display format adopting a bird's eye view method, FIG. 23C shows a three-dimensional bird's eye view map that three-dimensionally displays the ground level on the bird's eye view map by incorporating altitudes at individual points and FIG. 23D is a street/building map.

In addition, selector switches SW1 and SW2 for switching the display to the bird's eye view map or the street/ building map are displayed within the screen when a two-dimensional map is on display as illustrated in FIG. 23A, selector switches SW3 and SW4 for switching the display to the three-dimensional bird's eye view map or the two-dimensional map are displayed within the screen when a bird's eye view map is on display as illustrated in FIG. 23B, selector switches SW5 and SW6 for switching the display to the bird's eye view map or the two-dimensional map are displayed when a three-dimensional bird's eye view map is on display as illustrated in FIG. 23C and a selector switch SW7 for switching the display to the two-dimensional map is displayed when a street/building map is on display as illustrated in FIG. 23D.

Since, when the street/building map is to be displayed while the current display is the bird's eye view map or the three-dimensional bird's eye view map, the street/building map is brought up on display only after the two-dimensional map is first displayed with the selector switches provided in this manner, a display switch from the bird's eye view map or the three-dimensional bird's eye view map to the street/building map and a display switch from the street/building map to the bird's eye view map or the three-dimensional bird's eye view map are prohibited to avoid the confusion that the operator would otherwise experience if the display was switched between the bird's eye view map or the three-dimensional bird's eye view map and the street/building map and to prevent difficulty in viewing the screen.

Figure 34:
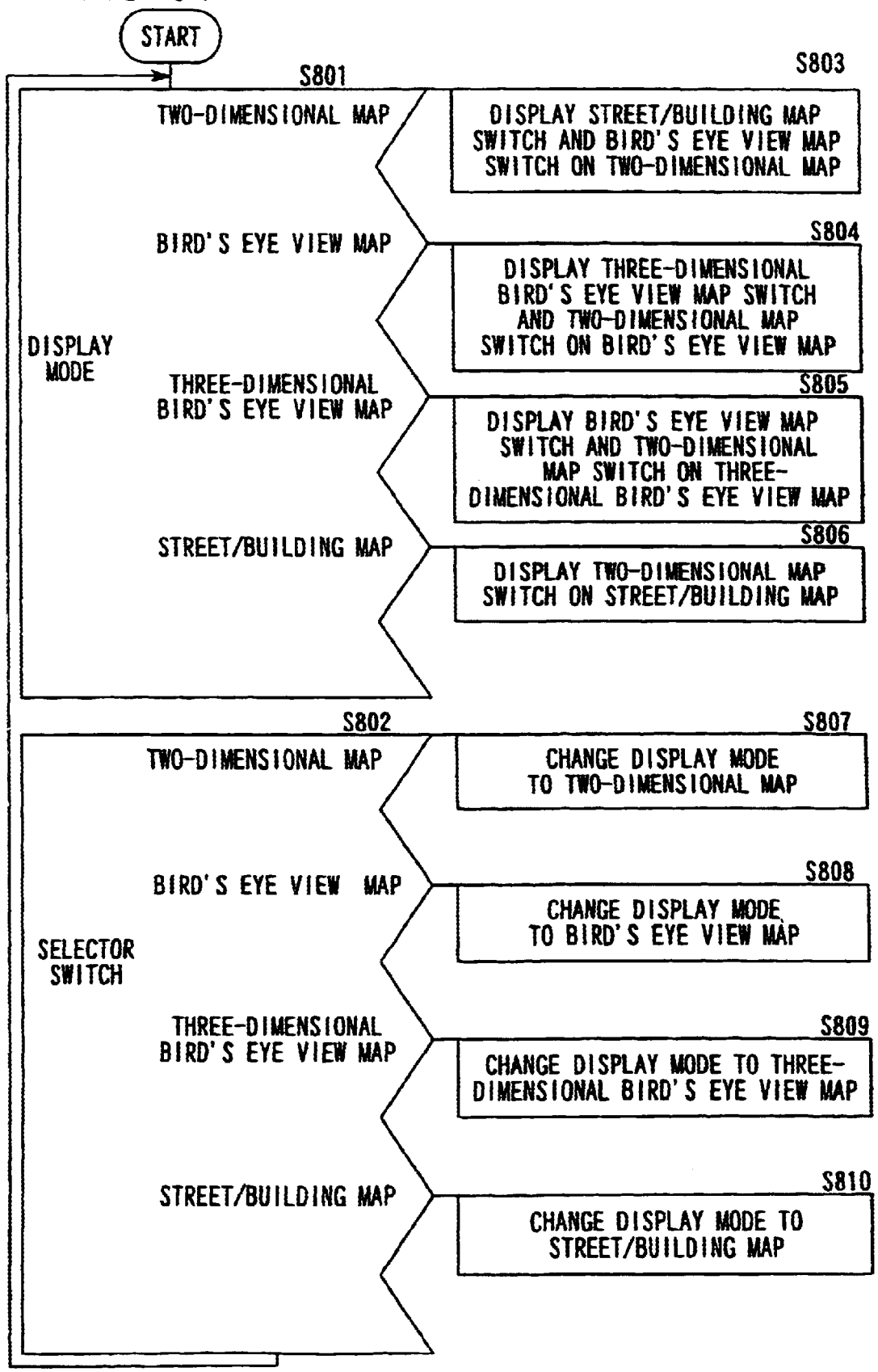
FIG. 34 is a flowchart of the control implemented for screen display switching.

FIG. 34 is a flowchart of the control implemented for the screen display switching described above. This routine is executed over specific time intervals as a screen display switching task while a given map is on display on the screen. In step S801, the display mode that is currently set is judged. In correspondence to the display mode thus ascertained, an individual task for displaying selector switches SW1 through SW7 on the screen is activated. In step S802, a decision is made as to which of the selector switches SW1 through SW7 has been pressed, and an individual task is activated to switch to the map display mode that corresponds to the selector switch that has been determined to have been pressed.

In the task performed in step S803, the street/building map switch and the bird's eye view map switch are displayed on the two-dimensional map. In the task performed in step S804, the three-dimensional bird's eye view map switch and the two-dimensional map switch are displayed on the bird's eye view map. In the task performed in step S805, the bird's eye view map switch and the two-dimensional map switch are displayed on the three-dimensional bird's eye view map. In the task performed in step S806, only the two-dimensional map switch is displayed on the street/building map.

In the task performed in step S807, the display mode is changed to the two-dimensional map to display a two-dimensional map on the screen. In the task performed in step S808, the display mode is changed to the bird's eye view map to display a bird's eye view map on the screen. In the task performed in step S809, the display mode is changed to the three-dimensional bird's eye view map to display a three-dimensional bird's eye view map on the screen. In the task performed in step S810, the display mode is changed to the street/building map to display a street/building map on the screen.

Main Processing Procedure

Figure 24:
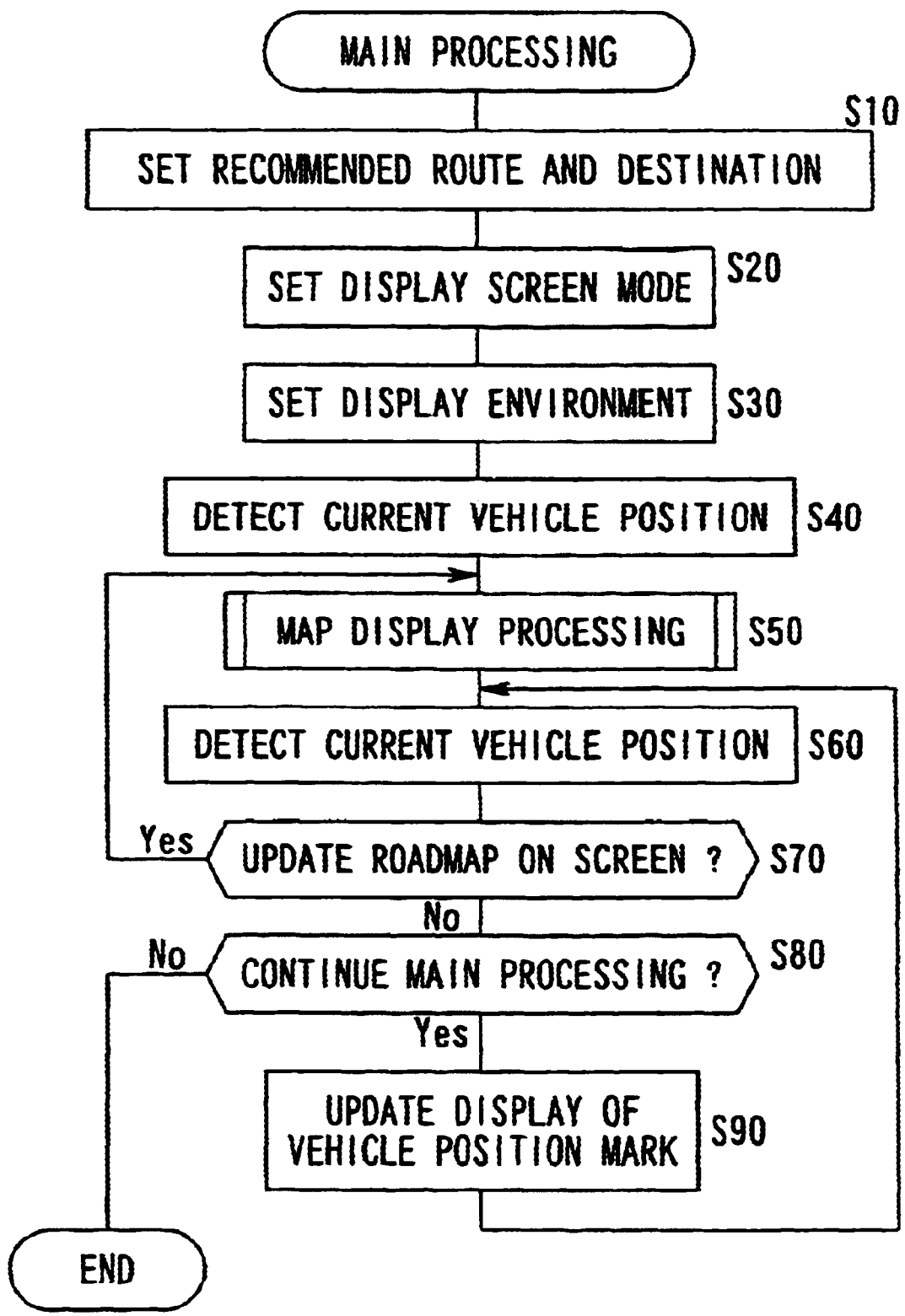
FIG. 24 is a flowchart illustrating the main processing.

FIG. 24 is a flowchart of the main processing performed by the control circuit 3, and the operation performed in the main processing in this embodiment is explained below in reference to the flowchart. It is to be noted that the control circuit 3 starts the processing in FIG. 24 when the key is operated to the IGNITION ON position. In step S10 in FIG. 24, the recommended route and the destination are set. The destination is set by the operator via the input device 4, and the recommended route is automatically set as illustrated in FIG. 18 through a calculation employing, for instance, the Dijkstra algorithm in the known art. In this case, the position detected by the current position detection device 1 may be used as the current position. Or, candidates for recommended routes may be stored in advance in a ROM or the like to select one of them as the recommended route.

In step S20, the display screen mode is set. The display screen mode to be set in this step is selected from a bird's eye view map display mode, a two-dimensional map display mode, a street/building map display mode and a three-dimensional bird's eye view map display mode, and selection is made from these modes by the operator via the touch panel switches SW1 through SW7 that have been explained earlier in reference to FIGS. 23A through 23D. In step S30, the display environment is set. The display environment to be set in this step includes, for instance, the screen display color, the selection between the night mode and day mode and the like. These selections concerning the display environment are made by the operator through the input device 4. In step S40, the current position of the vehicle is detected based upon a signal from the current position detection device 1. In step S50, the map display processing, which is detailed in FIGS. 25, 26, 27 and 28, is performed to display a map. The details of the map display processing are explained later.

In step S60, the current position is detected as in step S40. In step S70, a decision is made as to whether or not the roadmap on the screen is to be updated, i.e., whether or not the roadmap is to be redrawn. During this process, it is decided that the roadmap displayed on the screen is to be updated based upon the detected current position if the vehicle has traveled over a specific distance or more from the previous map update point. It is to be noted that this screen update is referred to as scrolling by the traveled distance to be differentiated from the screen scroll implemented with the scroll switch 4c.

If an affirmative decision is made in step S70, the operation returns to step S50, whereas if a negative decision is made, the operation proceeds to step S80. In step S80, a decision is made as to whether or not the main processing in FIG. 24 is to continue. For instance, if the power switch (not shown) has been turned off, if a switch for halting the processing has been operated or the like, a negative decision is made in step S80 to end the main processing illustrated in FIG. 24.

If an affirmative decision is made in step S80, the operation proceeds to step S90 to update the display of the vehicle position mark, before returning to step S60. While the vehicle position mark is displayed at the current position on the map, the display of the vehicle position mark is updated to move the vehicle position mark on the map in correspondence to the traveled distance until the map is scrolled by a specific distance in step S70. Other ancillary information is also updated in this step.

Figure 25:
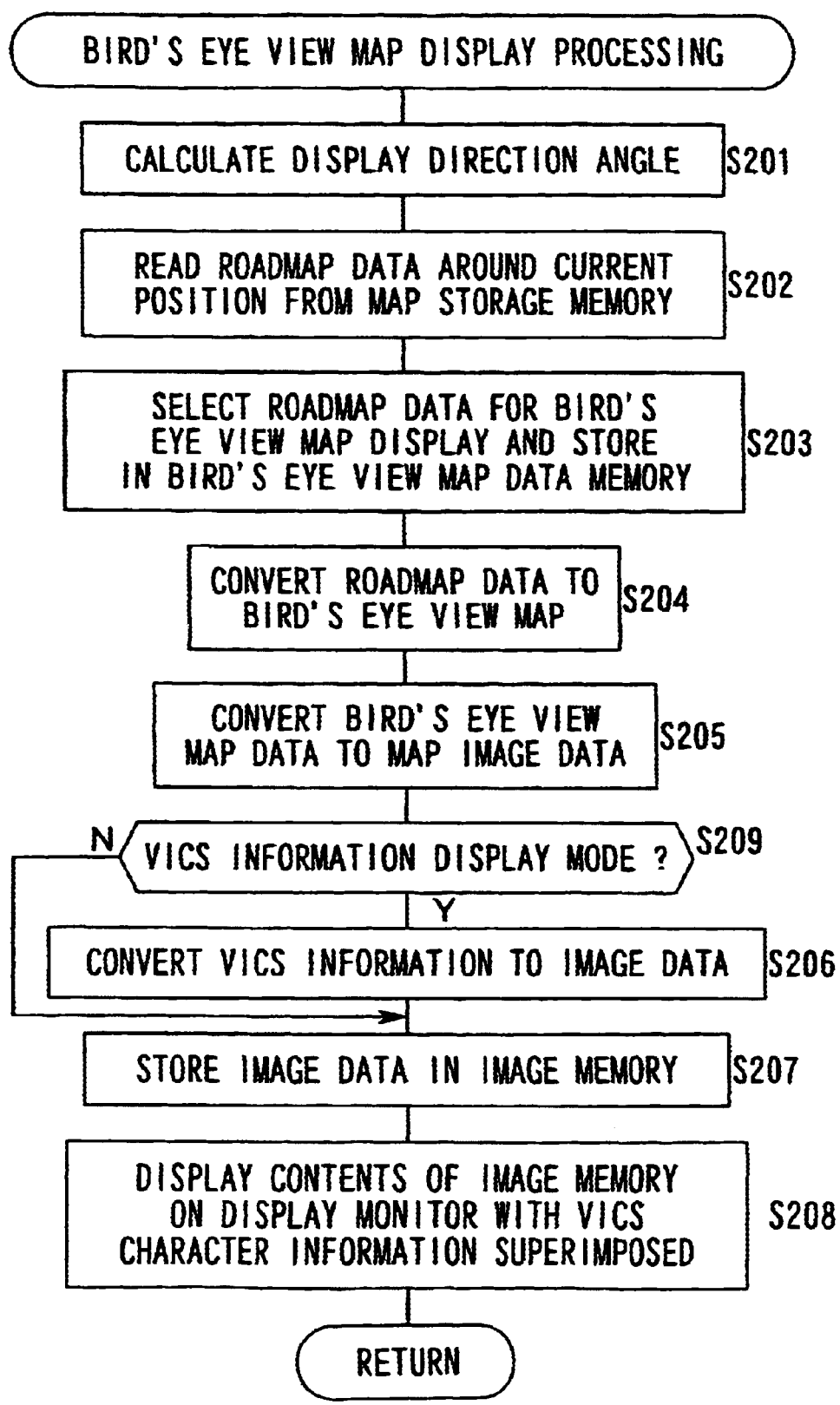
FIG. 25 is a flowchart illustrating the bird's eye view map display processing.

FIG. 25 is a flowchart illustrating in detail the bird's eye view map display processing in the map display processing performed in step S50 in FIG. 24. In step S201, the display direction angle for implementing map display through the bird's eye view method is calculated. In step S202, based upon the current position detected in step S40 or step S60 in FIG. 24 and the display direction angle calculated in step S201, the roadmap data in the vicinity of the current position are read from the map storage memory 2. For instance, the roadmap data corresponding to a square area several tens of kilometers by several tens of kilometers containing the current position may be read.

In step S203, required data for displaying a bird's eye view map are selected from the roadmap data read in step S201 and the selected data are stored in a bird's eye view map data memory 6A. During this process, in order to reduce the volume of data corresponding to the roadmap information to be displayed on the display monitor 8, only the data whose data classification satisfies specific requirements are taken out and stored in the bird's eye view map data memory 6. In step S204, the roadmap data selected in step S203 are converted to bird's eye view map data. The data conversion is implemented by adopting a bird's eye view method in the known art. In step S205, the bird's eye view map data resulting from the conversion performed in step S204 are converted to the final map image data to be displayed on the display monitor 8. If it is decided in step S209 that the VICS information display mode is set, the operation proceeds to step S206, whereas if a negative decision is made in step S209, the operation proceeds to step S207. In step S206, the graphic information in the VICS information to be detailed later is converted to map image data. In step S207, the map image data and VICS graphic image data are stored in the image memory 7, and then in step S208, the corresponding image is displayed on the display monitor 8.

The display in the VICS information display mode is implemented with VICS character information superimposed upon the map and the VICS graphic information. At this point, since the VICS character information includes the point in time at which the data have been provided, this time point is displayed in an upper portion of the screen to indicate that the display screen is in the VICS information display mode. In addition, as detailed later, the background color and the like are switched in correspondence to the selection/non-selection of the VICS information display mode.

Figure 26:
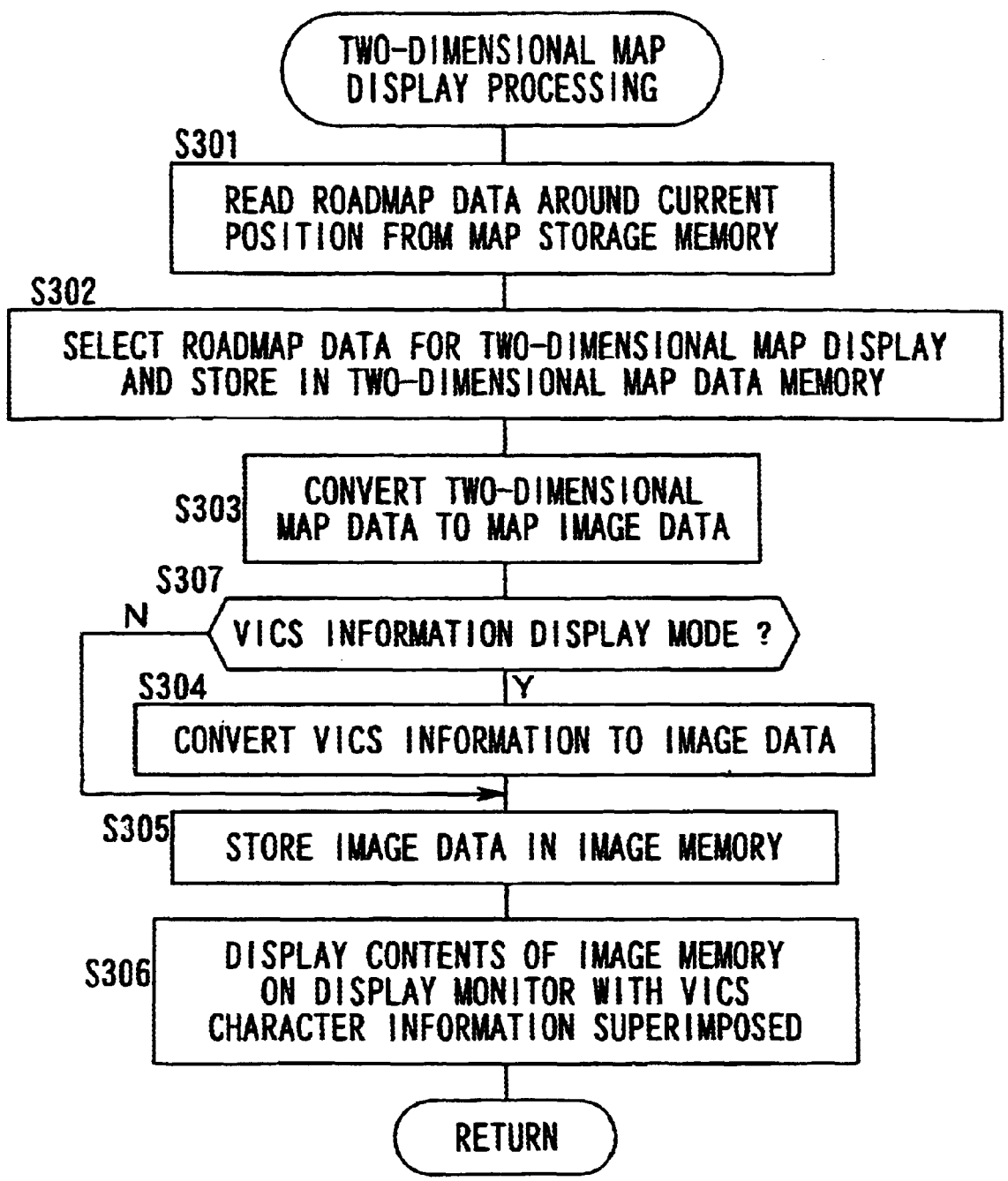
FIG. 26 is a flowchart illustrating the two-dimensional map display processing.

FIG. 26 is a flowchart illustrating in detail the two-dimensional map display processing in the map display processing performed in step S50 in FIG. 24. In step S301, roadmap data in the vicinity of the current position detected in step S40 or S60 in FIG. 24 are read from the map storage memory 2. For instance, roadmap data corresponding to a square area several tens of km by several tens of km that contain the current position may be read.

In step S302, data that are required for displaying a two-dimensional map are selected from the roadmap data read in step S301 and the data thus selected are stored in the two-dimensional map data memory 5A. In step S303, the roadmap data selected in step S302 are converted to two-dimensional map data for display on the display monitor 8. If it is decided in step S307 that the VICS information display mode is set, the operation proceeds to step S304, whereas if a negative decision is made in step S307, the operation proceeds to step S305. In step S304, graphic information in the VICS information, which is to be detailed later, is converted to map image data. In step S305, the map image data and the VICS information image data are stored in the image memory 7, and the corresponding image is displayed on the display monitor 8 in step S306. The display in the VICS information display mode is implemented by superimposing the VICS character information upon the map and the VICS graphic information. At this point, since the point in time at which the data have been provided is included in the VICS character information, this point in time at which the data have been provided is displayed in an upper portion of the screen to indicate that the display screen is in the VICS information display mode.

Figure 27:
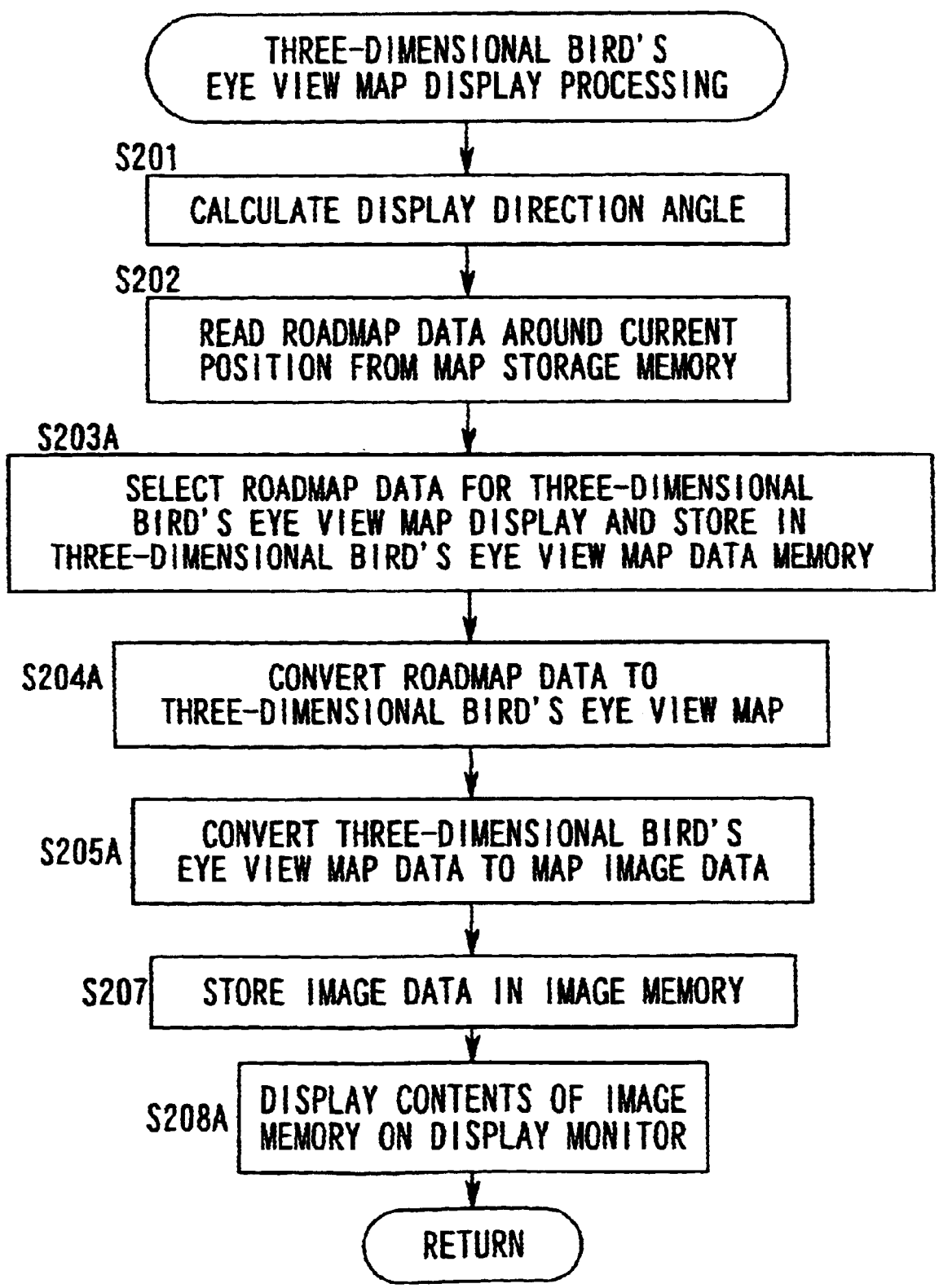
FIG. 27 is a flowchart illustrating the three-dimensional bird's eye view map display processing.

FIG. 27 is a flowchart illustrating in detail the three-dimensional bird's eye view map display processing in the map display processing performed in step S50 in FIG. 24. The same reference numbers are assigned to the corresponding steps in FIG. 25 and only the differences are explained here.

In step S203A, data that are used for displaying a three-dimensional bird's eye view map are selected from the roadmap data read in step S201 and the data thus selected are stored in the three-dimensional bird's eye view map data memory 6B.

In this step, in order to reduce the volume of data corresponding to the roadmap information to be displayed on the display monitor 8, only data whose data classification satisfies specific requirements are taken out to be stored in the three-dimensional bird's eye view map data memory 6B. In step S204A, the roadmap data selected in step S203A are converted to three-dimensional bird's eye view map data. The data conversion is performed by adopting a method that incorporates heights explained earlier with the bird's eye view method in the known art. In step S205A, the three-dimensional bird's eye view map data obtained through the conversion performed in step S204A are converted to the final map image data for display on the display monitor 8. When the conversion processing in step S205A is completed, the operation proceeds to step S207. In other words, in the three-dimensional bird's eye view map display mode, it is ensured that the screen display does not become too crowded by not displaying VICS information even if there is VICS information. Then, in step S208A, the contents of the image memory are displayed on the display monitor 8.

Figure 28:
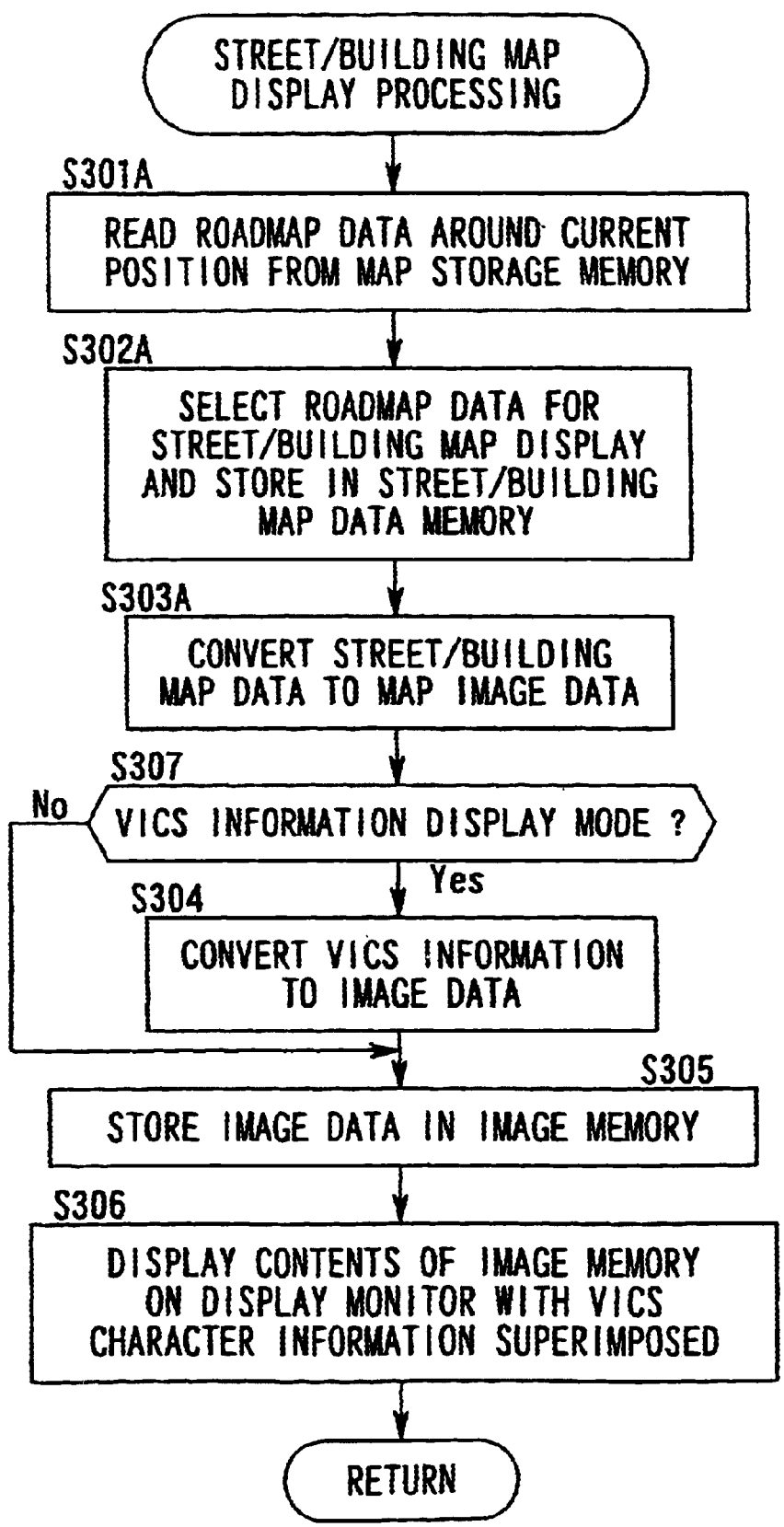
FIG. 28 is a flowchart illustrating the street/building map display processing.

FIG. 28 is a flowchart illustrating in detail the street/building map display processing in the map display processing performed in step S50 in FIG. 24. In step S301A, street/building map data in the vicinity of the current position detected in step S40 or S60 in FIG. 24 are read from the map storage memory 2. For instance, street/building map data corresponding to a square area several tens of km by several tens of km that contain the current position may be read.

In step S302A, data that are used for displaying a street/building map are selected from the street/building map data read in step S301 and the data thus selected are stored in the street/building map data memory 5B. In step S303A, the street/building map data selected in step S302A are converted to street/building map data for display on the display monitor 8. As in the three-dimensional bird's eye view map display mode, the VICS information display may be prohibited in the street/building map display mode.

INDUSTRIAL APPLICABILITY

It is to be noted that while the explanation has been even in reference to a navigation system installed in a vehicle, the present invention may be employed in a traffic information display apparatus, a vehicle guidance apparatus, a road information monitor apparatus or the like installed at a command base station.

Figure 35:
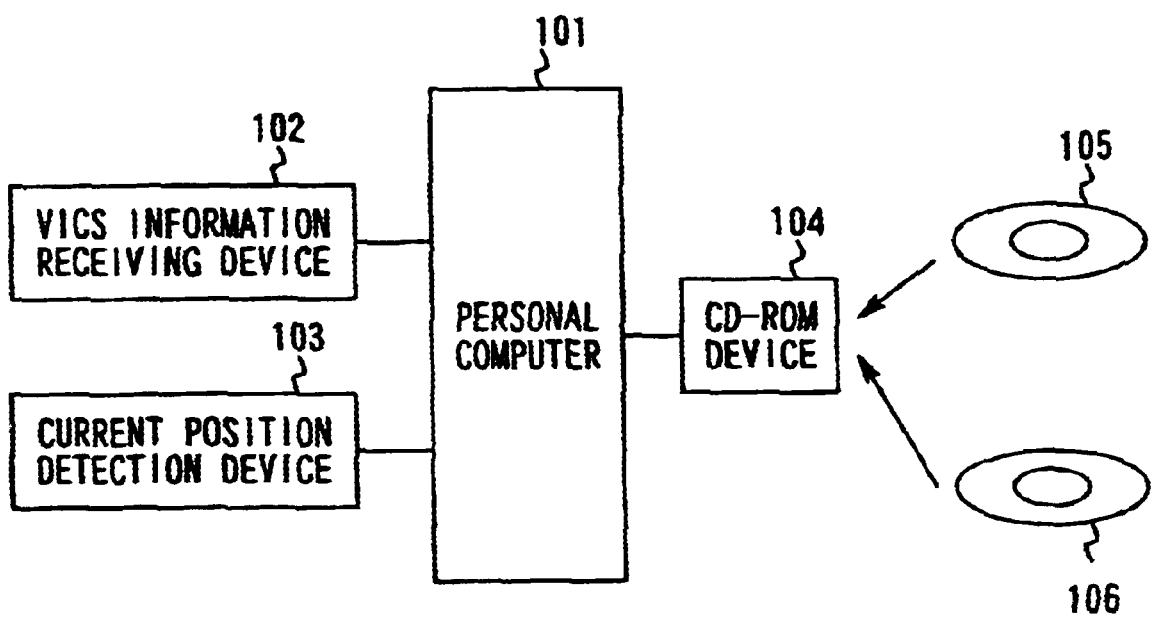
FIG. 35 is a block diagram of the map display apparatus employing a Personal Computer.

In addition, application software programs which execute the various types of map display processing described above may be stored in a recording medium, and similar display can be implemented by using a personal computer or the like that can be mounted in a vehicle with the recording media. FIG. 35 illustrates such a configuration. Reference number 101 indicates a personal computer that can be mounted in a vehicle, reference number 102 indicates a VICS information receiving device, reference number 103 indicates a current position detection device, reference number 104 indicates a CD ROM device, reference number 105 indicates a roadmap data CD ROM and reference number 106 indicates an application program CD ROM. The VICS information receiving device 102 corresponds to the FM multiplex broadcasting receiving device 9, the light beacon receiving device 10, the electromagnetic wave beacon receiving device 11 in FIG. 1, and the current position detection device 103 corresponds to the bearing sensor 1a, the vehicle speed sensor 1b, the GPS sensor 1c and the like in FIG. 1. The roadmap data CD ROM 105 corresponds to the recording medium portion of the map storage memory 2 in FIG. 1. The application program CD ROM 106 is a recording medium in which the various control programs in the embodiment explained above are stored in a format that enables execution of the programs by the personal computer 101. With the personal computer 101 loading programs from the application program CD ROM 106 to execute them, a map display apparatus similar to that in the embodiment described earlier can be constituted.

It is to be noted that the CD ROMs mentioned above may be replaced by other recording media such as floppy disks. In addition, the personal computer 101 that can be mounted in a vehicle may be a control apparatus that is exclusively employed for a map display apparatus. In such a case, too, since the control programs for controlling the map display apparatus and roadmap data can be provided from external recording media such as CD ROM, floppy disk or the like, various types of map display apparatuses can be realized simply by replacing software. Furthermore, the present invention may be adopted in a personal computer, a work station, a general purpose computer or the like, employed in the traffic information display apparatus, the vehicle guidance apparatus, the road information monitor apparatus and the like installed at a command base station as described earlier.

What is claimed is:

1. A map database device for displaying a bird's eye view map by converting a two-dimensional map into a display format of a bird's eye view method, comprising:

an element point data portion in which positional coordinates of each element point existing in said two-dimensional map are stored, the two-dimensional map being divided into a plurality of areas; and a height data portion in which a plurality of height data respectively corresponding to altitudes of the plurality of areas into which said two-dimensional map is divided are respectively stored, each of the plurality of areas being assigned only one of the plurality of height data, wherein one of the plurality of height data corresponding to one of the plurality of areas is common for all element points existing in the one of the plurality of areas; and the plurality of height data are used for displaying the bird's eye view map.

2. A map database device for displaying a bird's eye view map by converting a two-dimensional map into a display format of a bird's eye view method, comprising:

a height data portion in which a plurality of height data respectively corresponding to altitudes of a plurality of areas into which said two-dimensional map is divided are respectively stored, each one of the plurality of areas being assigned only one of the plurality of height data; and a road data portion in which a road extending within said two-dimensional map is expressed with element points, and positional coordinates of each of the element points in said two-dimensional map are stored, wherein one of the plurality of height data corresponding to one of the plurality of areas is common for all element points existing in the one of the plurality of areas; and the plurality of height data are used for displaying the bird's eye view map.

3. A map display apparatus for displaying a bird's eye view map by converting a two-dimensional map into a display format of a bird's eye view method, comprising:

a database device that includes at least a height data portion in which a plurality of height data respectively corresponding to altitudes of a plurality of areas into which said two-dimensional map is divided are respectively stored, each One of the plurality of areas being assigned only one of the plurality of height data, and a road data portion in which a road extending within said two-dimensional map is expressed with element points and positional coordinates of each of the element points in said two-dimensional map are stored; and a calculation device that performs calculation to determine in which of said areas each of the element points read out from said road data portion is located, reads out height data corresponding to one of said areas ascertained through said calculation from said height data portion to use as height data for all element points existing in the one of said areas ascertained through said calculation, and calculates coordinate values of each of the plurality of element points on said bird's eye view map to be displayed on a monitor screen based upon positional coordinates read out from said road data portion and said height data read out from said height data portion.

4. A map display apparatus for displaying a bird's eye view map by converting a two-dimensional map into a display format of a bird's eye view method, comprising:

an element point data portion in which positional coordinates of each of element points existing in said two-dimensional map are stored, the two-dimensional map being divided into a plurality of areas;

a height data portion in which a plurality of height data respectively corresponding to altitudes of a plurality of areas into which said two-dimensional map is divided are respectively stored, each one of the plurality of areas being assigned only one of the plurality of height data, one of the plurality of height data corresponding to one of the plurality of areas being common for all element points existing in the one of the plurality of areas;

a calculation device that calculates coordinate values on said bird's eye view map to be displayed on a monitor screen for a point in each of the areas based upon positional coordinates and height data of the point; and a gradation device that achieves gradation display of areas enclosed by the points on the monitor screen in correspondence to heights of the individual points.

5. A map display apparatus for displaying a bird's eye view map by converting a two-dimensional map into a display format bird's eye view method, comprising:

a map database device that includes a height data portion in which height data respectively corresponding to altitudes of a plurality of areas into which said two-dimensional map is divided are respectively stored in correspondence to the areas, a road data portion in which a road within said two-dimensional map is expressed with a plurality of element points and positional coordinates of each of the element points of the road in said two-dimensional map are stored, and a tunnel data portion in which a tunnel within said two-dimensional map is expressed with a plurality of element points and positional coordinates of each of the element points of the tunnel in said two-dimensional map are stored; and a calculation device that comprises a first calculation unit that calculates coordinate values of said element points of the road on said bird's eye view map to be displayed on a monitor screen based upon positional coordinates read out from said road data portion and height data read out from said height data portion corresponding to areas in which said element points of the road exist, a second calculation unit that performs calculation to determine in which of said areas are located element points corresponding to an entrance and an exit among said element points of the tunnel read out from said tunnel data portion, a reading unit that reads out height data corresponding to the areas determined through said calculation from said height data portion to use as height data of said entrance and said exit, an interpolation unit that interpolates other element points of the tunnel with said height data of said entrance and said exit to create height data therefor without using height data in said height data portion corresponding to areas in which said other element points of the tunnel exist, and a third calculation unit that calculates coordinate values of said element points of the tunnel on said bird's eye view map to be displayed on a monitor screen based upon positional coordinates read out from said tunnel data portion and height data obtained through interpolating calculation.

6. A map display apparatus for displaying a bird's eye view map by converting a two-dimensional map into a display format bird's eye view method, comprising:

a height data portion in which height data respectively corresponding to altitudes of a plurality of areas into which said two-dimensional map is divided are respectively stored in correspondence to the areas;

a calculation device that calculates coordinate values on said bird's eye view map to be displayed on a monitor screen for a point in each of said areas based upon positional coordinates and height data of the point; and a gradation device that comprises a height difference calculation unit that calculates a difference between a minimum height and a maximum height among a plurality of areas enclosed by said points within said monitor screen, a first assigning unit that respectively assigns m sets of color data among height color data, which is provided in a predetermined order in correspondence to heights in advance with a fixed gradation pitch, to m color palettes in the predetermined order when said difference is equal to or less than a specific value, a gradation pitch calculation unit that calculates a variable gradation pitch, which is larger than the fixed gradation pitch, by dividing said difference by m if said difference exceeds said specific value, and a second assigning unit that assigns m sets of color data among said height color data provided in said predetermined order to said m color palettes with said variable gradation pitch, in order to achieve gradation display of each of areas enclosed by the points on the monitor screen in correspondence to heights of the individual points.

7. A product which can be read by a computer, comprising a recording medium in which:

map data that has an element point data portion in which positional coordinates of each of element points existing in a two-dimensional map are stored and a height data portion in which height data respectively corresponding to altitudes of a plurality of areas into which the two-dimensional map is divided are respectively stored, each of the plurality of areas being assigned only one of the plurality of height data, for displaying a bird's eye view map by converting the two-dimensional map into a display format of bird's eye view method, wherein said height data corresponding to one of the plurality of areas is common for all element points existing in the one of the plurality of areas; and the plurality of height data are used for displaying the bird's eye view map.

8. A map display apparatus for displaying a bird's eye view map by converting a two-dimensional map into a display format of a bird's eye view method, comprising:

map data that include two-dimensional map data and height data; and a three-dimensional bird's eye view map display device that three-dimensionally displays said bird's eye view map on a display screen based upon said map data taking said height data into consideration, wherein:

said map data comprise detailed map data at a large scaling factor and wide range map data at a scaling factor smaller than said detailed data;

said display screen is divided into, at least, a first display area and a second display area adjacent to said first display area, said first display area being set at a side closer to a viewpoint in a bird's eye view method, and said second display area being set on a side further away from said viewpoint; and said three-dimensional bird's eye view map display device displays a three-dimensional bird's eye view map in said first display area based upon said detailed map data, displays a three-dimensional bird's eye view map in said second display area based upon said wide range map data, sets a hypothetical line of sight that extends from said viewpoint to pass through a point corresponding to a boundary of said first area and said second area on said display screen, and determines ranges, over which said detailed map data and said wide range map data are to be used, in reference to a point at which said line of sight intersects a line that extends in a direction of said line of sight and corresponds to a ground level calculated by taking said height data into consideration, the calculated ground level having differences in elevation.

\* \* \* \* \*